May 7, 1963
R. H. CULLEN ET AL
3,088,529
FLUID-DRIVEN ENGINE
Filed Sept. 23, 1957
8 Sheets-Sheet 7
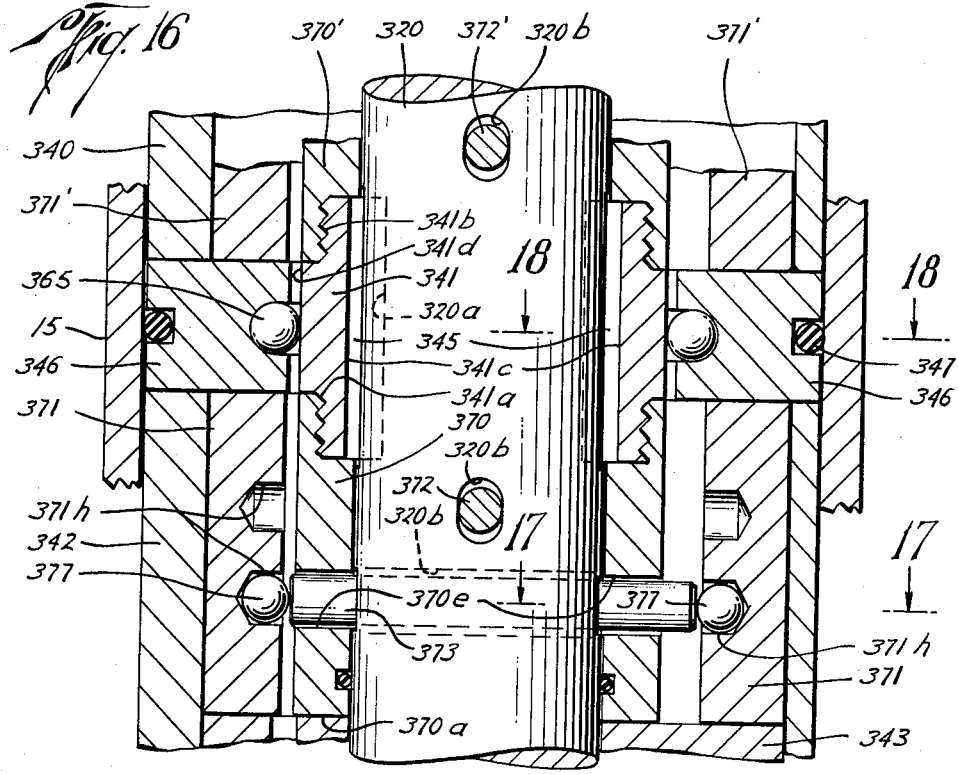
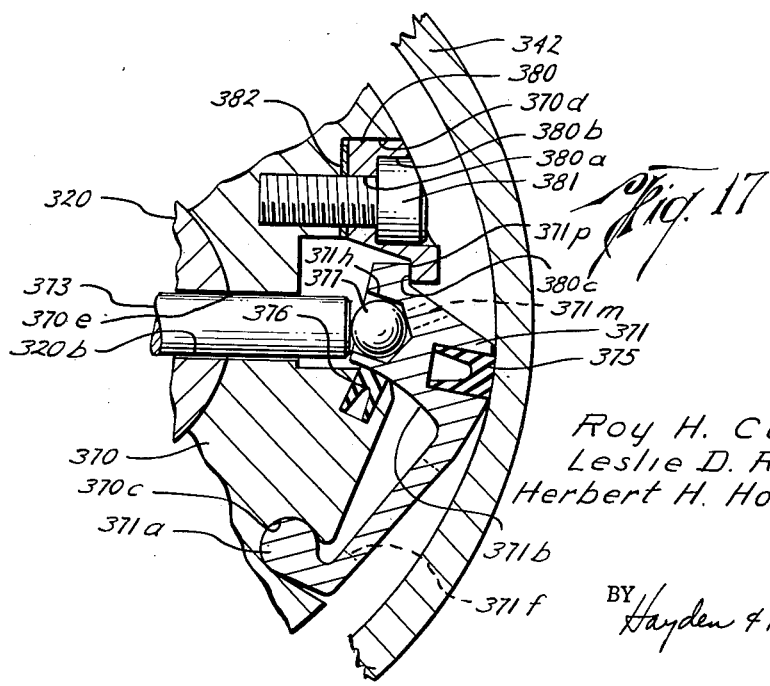
Roy H. Cullen
Leslie D. Richards
Herbert H. Hodgeman
INVENTORS
BY Hayden & Pravel
ATTORNEYS

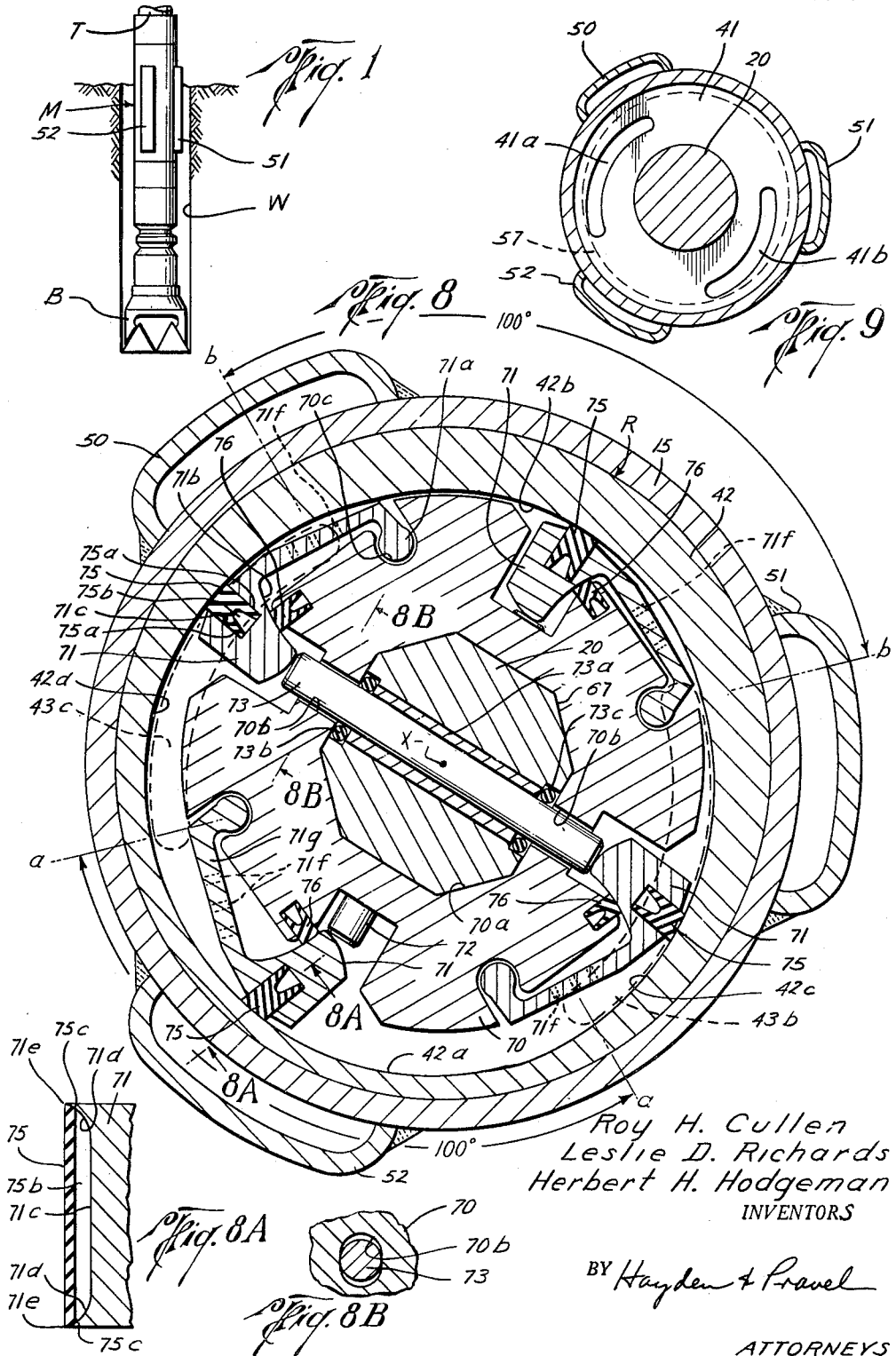

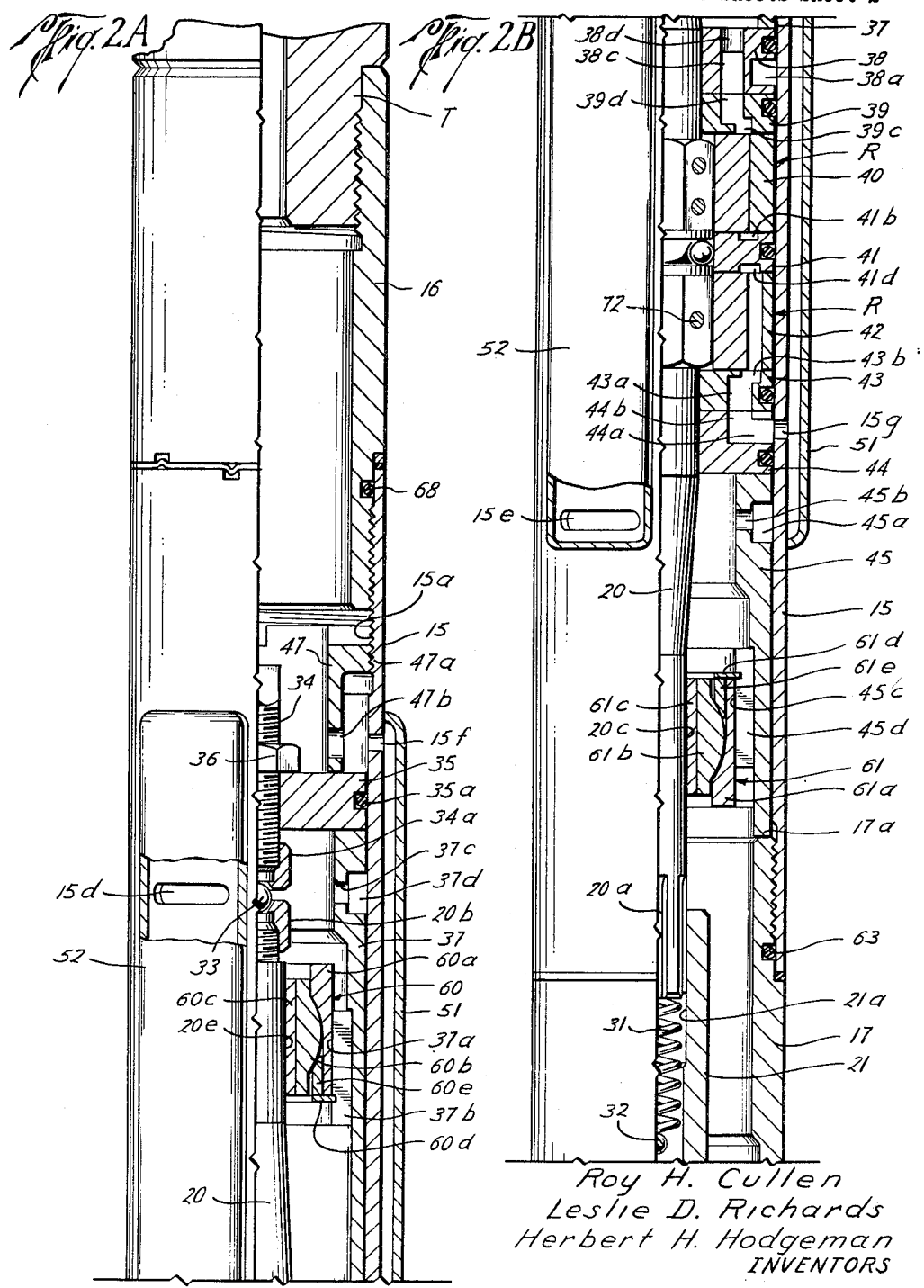

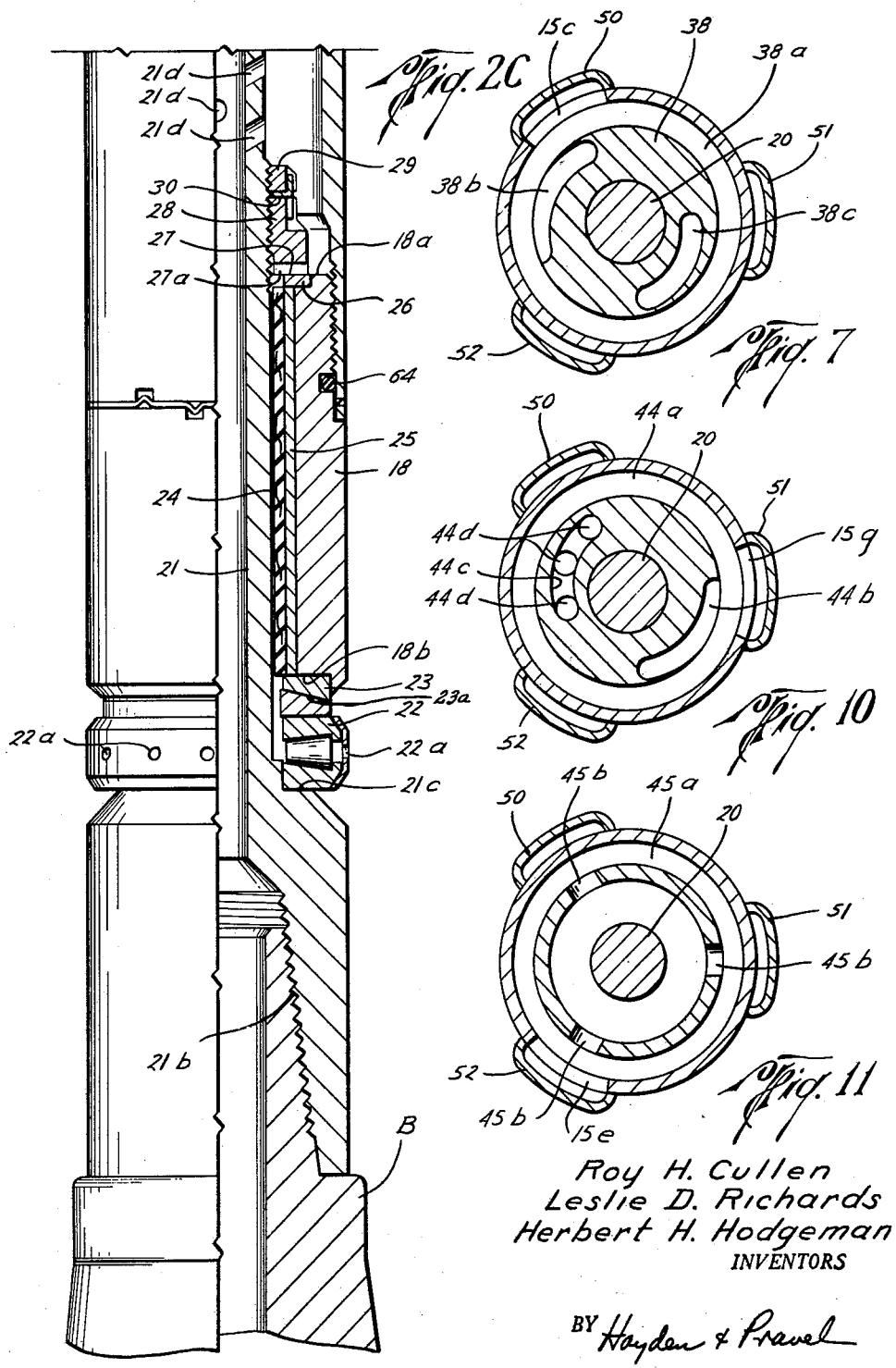

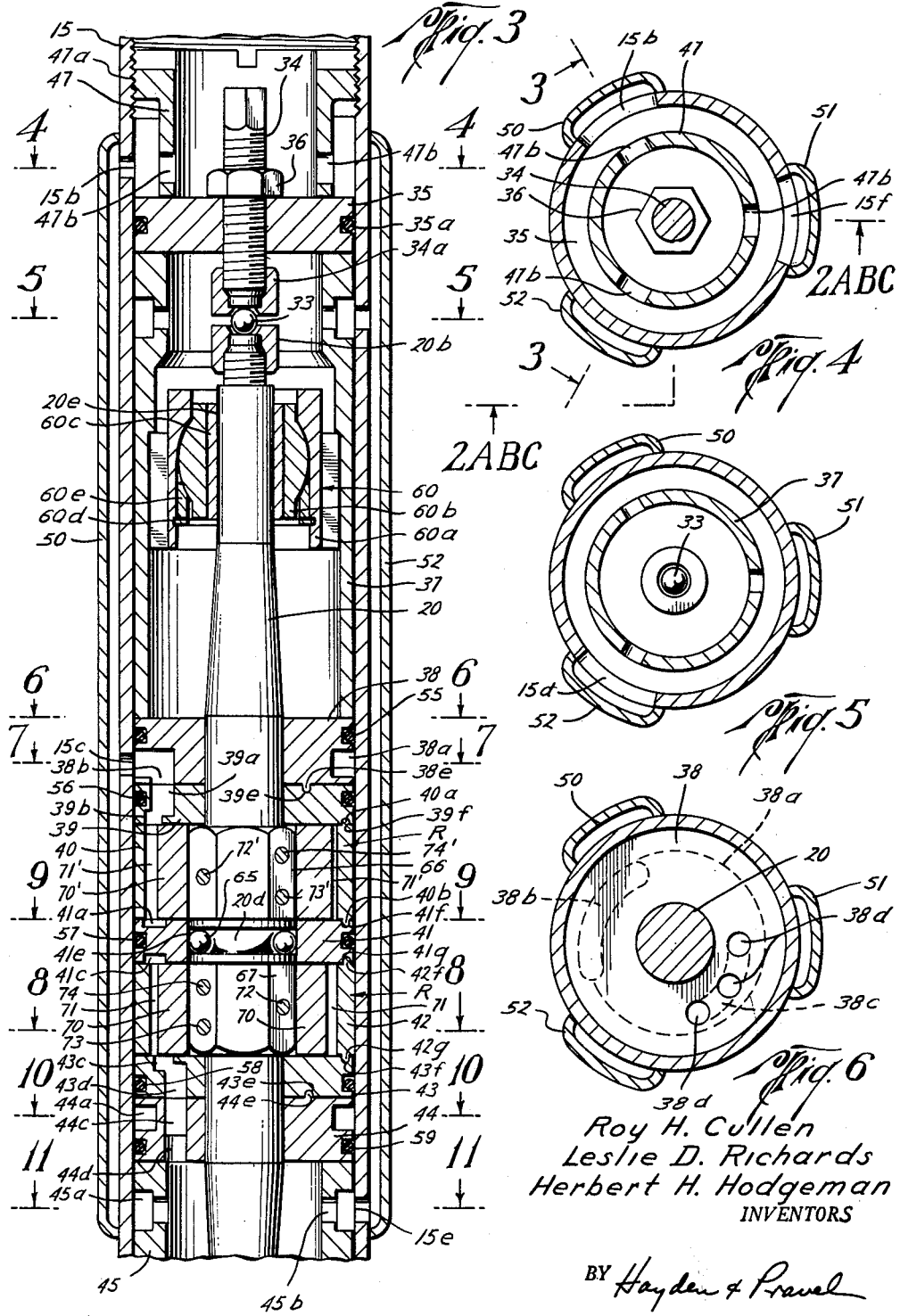

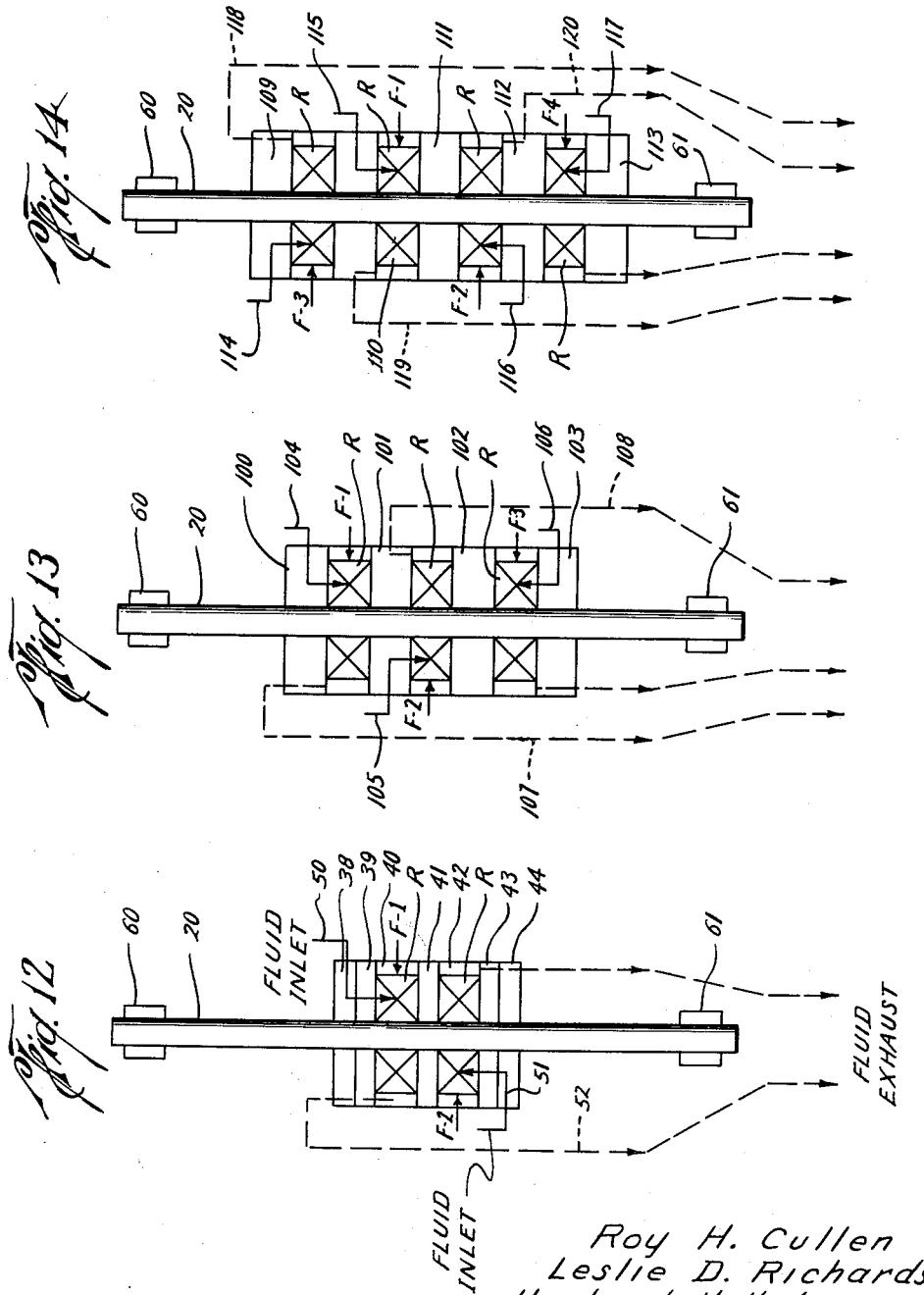

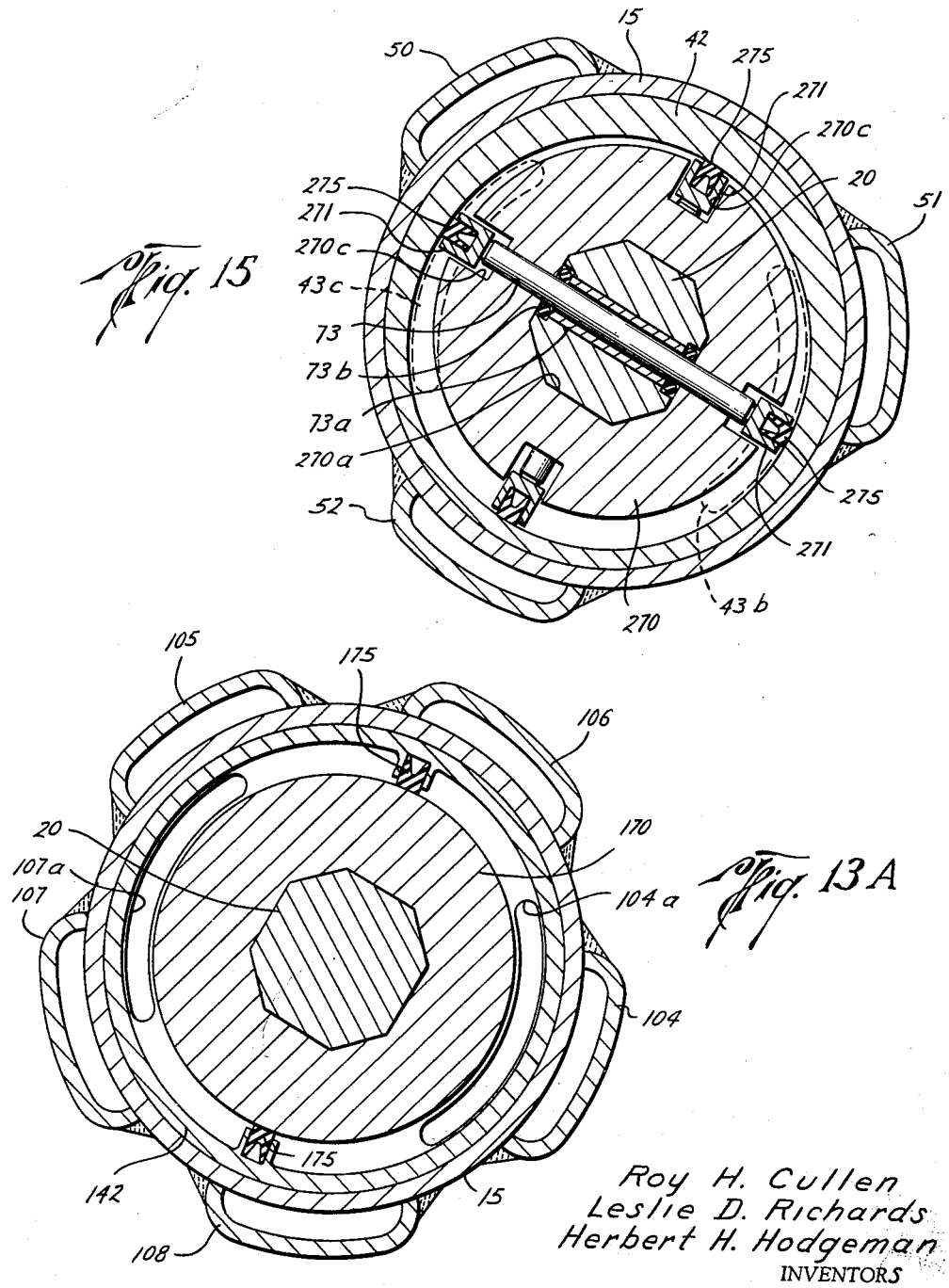

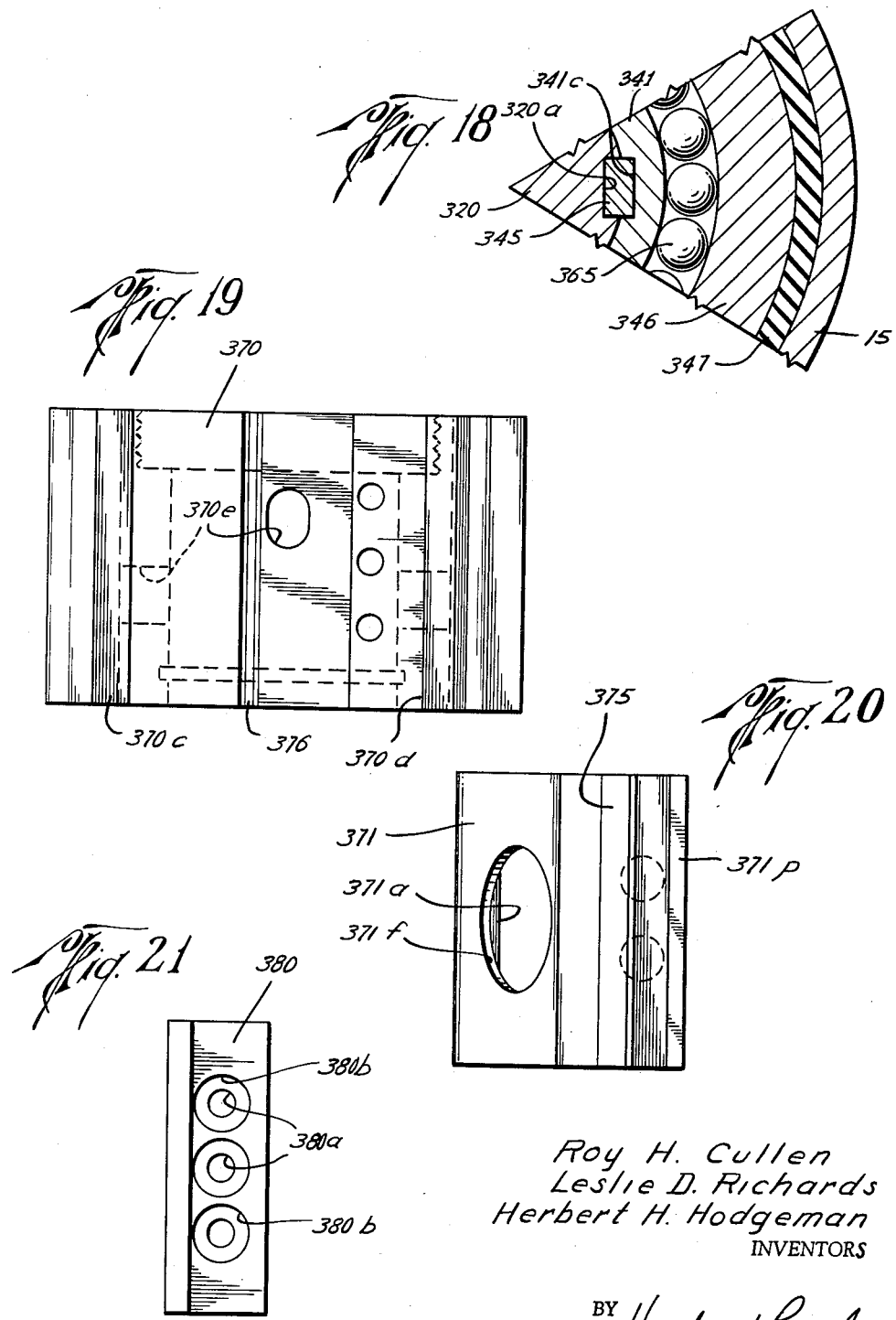

United States Patent Office 3,088,529
Patented May 7, 1963

3,088,529
FLUID-DRIVEN ENGINE
Roy H. Cullen, Leslie D. Richards, and Herbert H. Hodgeman, Houston, Tex.; said Richards and Hodgeman assignors to said Cullen
Filed Sept. 23, 1957, Ser. No. 685,605
27 Claims. (Cl. 175—107)

This invention relates to fluid-driven engines, and particularly to engines adapted to be positioned in a well for operation by drilling mud or other well fluid.

This application is a continuation-in-part of U.S. patent application, Serial No. 635,811, filed January 23, 1957, now abandoned, and is entitled to the filing date thereof as to all common subject matter.

An object of this invention is to provide a new and improved fluid-driven motor or engine for rotating a drill bit wherein the motor or engine is located in proximity to the drill bit, and wherein the drill bit is rotated without rotating the pipe string or tubular support for the engine and the drill bit.

An important object of this invention is to provide a new and improved positive displacement hydraulic engine which is adapted to be operated in a well bore by drilling mud or fluid supplied from the ground level at the top of the well for driving a drill bit at the bottom of the well bore, and which is so constructed that the power and rotational speed of the engine are positively controlled by the pressure and volume of the mud or other fluid supplied thereto from the ground level at the top of the well being drilled.

Another object of this invention is to provide a new and improved fluid-driven motor or engine for rotating a drill bit in a well bore, wherein the diameter of the motor or engine may be made of a minimum size to permit the drilling of relatively small diameter well bores to thereby reduce drilling and production costs, but at the same time to provide the motor or engine with such a construction that ample power and rotational speed for the drill bit may be developed without requiring an excessive length for the motor or engine as is now required for turbine motors and other apparatus used in drilling wells.

A further object of this invention is to provide a new and improved fluid-driven engine or motor which is so constructed that friction losses created by mechanical or hydraulic loading of the moving parts are eliminated or reduced to a minimum.

Another object is to provide a hydraulic engine in which the velocity of the fluid operating the motor is maintained at a minimum to reduce wear and erosion on the parts of the motor.

A still further object of this invention is to provide a new and improved fluid-driven motor or engine which is capable of driving a drill bit at speeds many times higher than is possible with conventional rotary drilling equipment.

Still another object of this invention is to provide a new and improved fluid-driven engine or motor wherein a pair of rotors are longitudinally positioned on a shaft substantially adjacent to each other with fluid under pressure being directed transversely to said rotors from diametrically opposite directions, and wherein bearing supports are provided for said shaft at a relatively great distance apart for resisting the couple force created by said fluid acting on said rotors with a minimum load on each bearing support.

An additional object of this invention is to provide a new and improved fluid-driven engine or pump having a shaft with rotors thereon, wherein the resultant lateral hydraulic force acting on the shaft is minimized or substantially reduced to thereby minimize or substantially reduce lateral forces acting on bearings for said shaft.

Another object of this invention is to provide a new and improved rotor and stator construction for a fluid-driven motor in which the rotor has one or more pairs of diametrically opposed vanes which move together laterally to maintain constant sealing contact with the inside surface of the stator and which do not require springs or resilient means to maintain such vanes in said sealing contact.

Another object of this invention is to provide a new and improved rotor and stator construction for a fluid-driven motor wherein the surface of the stator contacted by the vanes of the rotor is eccentrically formed with respect to the axis of rotation of the rotor but is so constructed and shaped that all diameters which pass through the axis of rotation of the rotor to said surface of the stator are equal, and wherein the vanes which are oppositely disposed with respect to each other on the rotor are mounted for moving together in accordance with the eccentricity of said surface of the stator.

A further object of this invention is to provide a new and improved positive displacement motor which is operable by drilling mud or other relatively coarse and abrasive fluid rather than the fluids such as the high grade oils which are presently used for driving positive displacement motors, and wherein said motor is hydraulically balanced throughout to reduce friction losses, and is also otherwise constructed to substantially eliminate angular contacts between the moving parts and to prevent sticking or jamming of mud or other particles in the motor as the mud or other relatively coarse fluid flows therethrough to operate same.

Another object of this invention is to provide a new and improved seal construction which is especially adapted for use with positive displacement motors of the vane type.

It is a further object of this invention to provide a positive displacement hydraulic engine of the vane type in which the radial velocity of the vanes and the radial accelertaion and deceleration of the vanes is at a minimum to conserve power and reduce wear.

It is a further object of this invention to provide a positive displacement hydraulic engine of the vane type in which the vanes coact with the rotors and in which the vanes coact with the stators by such construction that friction therebetween is reduced to an absolute minimum and at the same time adequate sealing against pressure loss is provided therebetween.

It is a further object of this invention to provide a new and improved positive displacement pump adapted to discharge, under pressure, any fluid commonly associated with the drilling, maintenance or functioning of a subterranean well bore.

It is a further object of this invention to provide a positive displacement hydraulic engine of the vane type of such construction that replaceable seals are provided to coact between vanes and rotors and/or between vanes and stators and that said seals are captive within their respective recesses or housings.

It is a further object of this invention to provide a positive displacement hydraulic engine of the vane type of such construction that assembly and disassembly thereof can be accomplished without recourse to special tools, jigs and fixtures, thereby to facilitate servicing under adverse field conditions.

An additional object of this invention is to provide a new and improved rotor and stator construction for a fluid-driven engine wherein a pair of rotors are mounted for rotation together and for limited longitudinal movement together whereby the fluid pressure acting on the ends of the pair of rotors is substantially balanced to avoid or reduce any binding contact between the rotors and the enclosure in said engine for said rotors.

A particular object of this invention is to provide a new and improved vane construction for a rotor and stator assembly in a fluid-driven engine wherein a plurality of such vanes is provided on the rotor for sealing contact with the stator as the rotor and vanes rotate relative to the stator, and wherein means are provided for limiting the movement of the vanes into the sealing contact with the stator to thereby reduce or eliminate any adverse retarding force which might be created as the vanes move in contact with and relative to the stator but at the same time permitting proper sealing with the stator.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is an elevation illustrating the use of the fluid-driven motor or engine of this invention with a drill bit for drilling a well bore;

FIGS. 2A, 2B and 2C are views, partly in elevation and partly in section, taken on line 2ABC—2ABC of FIG. 4, to illustrate the details of the fluid driven motor or engine of this invention from its upper to its lower end;

FIG. 3 is a view, partly in elevation and partly in section, taken on line 3—3 of FIG. 4, to illustrate further details of the fluid-driven motor or engine of this invention;

FIG. 4 is a cross-sectional view taken on line 4—4 of FIG. 3;

FIG. 5 is a cross-sectional view taken on line 5—5 of FIG. 3;

FIG. 6 is a cross-sectional view taken on line 6—6 of FIG. 3;

FIG. 7 is a cross-sectional view taken on line 7—7 of FIG. 3;

FIG. 8 is an enlarged cross-sectional view taken on line 8—8 of FIG. 3;

FIG. 8A is a partial sectional view taken on line 8A—8A of FIG. 8;

FIG. 8B is a partial sectional view taken on line 8B—8B of FIG. 8;

FIG. 9 is a cross-sectional view taken on line 9—9 of FIG. 3;

FIG. 10 is a cross-sectional view taken on line 10—10 of FIG. 3;

FIG. 11 is a cross-sectional view taken on line 11—11 of FIG. 3;

FIG. 12 is a diagrammatic view of the preferred embodiment of the apparatus of this invention which has been illustrated in detail in FIGS. 1–11;

FIG. 13 is a diagrammatic view of a modified form of the apparatus of this invention;

FIG. 13A is a sectional view illustrating a modified construction of the rotor assembly R.

FIG. 14 is a diagrammatic view of another modified form of the apparatus of this invention; and FIG. 15 is a sectional view corresponding to FIG. 8 except that the swinging vanes have been replaced with sliding vanes.

FIG. 16 is an enlarged view, partly in section and partly in elevation illustrating a modified portion of the engine shown in FIGS. 2A–3;

FIG. 17 is a horizontal sectional view taken on line 17—17 of FIG. 16 to illustrate the modified portion of FIG. 16 more fully;

FIG. 18 is a fragmentary sectional view taken on line 18—18 of FIG. 16;

FIG. 19 is an elevation illustrating a rotor of one rotor assembly shown in FIG. 16;

FIG. 20 is an elevation illustrating a vane of one rotor assembly shown in FIG. 16; and FIG. 21 is an elevation of a clamping plate construction for one rotor assembly of FIG. 16.

In the drawings, the letter M designates generally the fluid-driven motor or engine of this invention which is adapted to be used for imparting rotation to a drill bit B for drilling a well bore W. Briefly, the fluid-driven motor M is adapted to be suspended from the surface of the well on a tubing T which may be the normal relatively rigid drill string but which preferably is a hose or other flexible support. The drilling mud or other similar well fluid which is used for drilling with the drill bit B is pumped downwardly through the tubing string T for imparting rotation to the fluid-driven motor or engine M, as will be more fully explained, so that the rotary motion is thereby imparted to the drill bit B to accomplish the drilling of the well bore W. After the drilling mud or other similar well fluid has passed through the fluid-driven motor M, it flows to the drill bit B and is used in the conventional manner for assisting in the drilling of the well bore W and for facilitating the removal of the cuttings therefrom.

Considering the invention in detail, and in particular FIGS. 2A, 2B and 2C, and FIG. 3, the fluid-driven motor or engine M has an elongate tubular housing 15 which is connected at its upper end with the tubing string T by means of a threaded adapter 16 or any other suitable connecting means. The tubing string T will ordinarily include drill collars at its lower end for providing weight on the drill bit B, but such drill collars are well known and are therefore not illustrated. The tubular housing 15 has a tubular spacer section 17 threadedly connected therewith to provide the internal annular shoulder 17a for a purpose to be hereinafter explained. The spacer sleeve 17 also has connected therebelow a bearing sleeve 18 (FIG. 2C) so that an annular internal lateral shoulder 18a is provided, the purpose of which will be more evident hereinafter. Actually, the sleeves 17 and 18 may be considered as part of the tubular housing for the fluid-driven motor or engine M.

A shaft 20 (FIG. 3) is mounted within the housing 15 for rotation relative thereto. The shaft 20 has mounted thereon a plurality of rotor assemblies R, the details of which will be explained hereinafter, which are rotated by fluid under pressure supplied thereto from the top of the well through the tubing string T, as will be explained. The rotation of the shaft 20 which is supplied through the operation of the rotor assembly or assemblies R is transmitted to the drill bit B (FIGS. 1 and 2C) through a hollow connecting stem 21 (FIG. 2B). The shaft 20 is connected to the hollow stem 21 by the interengagement of splines 20a on the shaft 20 with corresponding splines 21a on the internal surface of the hollow stem 21 so that the shaft 20 is axially or longitudinally movable relative to the hollow stem 21, but rotational movement of the shaft 20 is transmitted directly to the hollow stem 21 through such splines 20a and 21a. The stem 21 also has internal threads 21b (FIG. 2C) for connection with the drill bit B so that there is a direct connection from the shaft 20 to the drill bit B for imparting the rotation of the shaft 20 to the drill bit B.

To resist thrust as the drill bit B is rotated, a roller thrust bearing 22 (FIG. 2C) of conventional construction, and equalizer bearing 23 which is also of conventional construction are preferably positioned between the annular lateral external shoulder 21c of the hollow stem 21 and the lower lateral surface 18b of the bearing sleeve 18. The bearing 22 is provided with openings 22a or other suitable means for permitting fluid to flow therethrough to effect the cooling and lubrication of the bearing 22 with the drilling mud, as will be more evident hereinafter. The equalizer 23 simply permits the bearing 22 to automatically align itself axially as the drill bit B rotates. Although not desirable, the equalizer 23 could be eliminated and the roller bearing 22 could be replaced with other types of bearings, such as a ball bearing or the like. A sleeve bearing 24, preferably of the type known as a "Goodrich Cutless" bearing which is formed of hard rubber or other relatively hard resilient material with longitudinal corrugations or grooves on its internal surface, is positioned around the stem 21 above the equalizer 23, and such bearing sleeve 24 is integral with a liner 25 which is confined within the sleeve 18. By reason of the internal grooves or corrugations on the bearing sleeve 24, fluid may flow longitudinally through the bearing 24 to cool and lubricate same.

An annular retaining bearing 26 (FIG. 2C) is mounted at the upper end 18a of the sleeve 18 for coaction with a complementary bearing surface 27 which is formed at the lower end of a retaining nut 28. The nut 28 has a plurality of radial or lateral grooves or notches 27a through which fluid may pass between the bearing rings 26 and 28. The retaining nut 28 has internal threads for adjustably positioning same on the external surface of the hollow stem 21 so that proper spacing can be made between the bearing ring 26 and the bearing surface 27. An annular lock nut 29 is also threaded on the external surface of the hollow stem 21 for locking the retaining nut 28 in position. A lock washer 30 may be utilized for locking the lock nut 29 to the retaining nut 28 to assist in the holding of the nut 28 in its selected position.

The lower end of the shaft 20 extends within the hollow stem 21 at its upper end and is interconnected therewith through the splines 20a and 21a, as previously explained. The lower end of the shaft 20 rests upon the relatively strong spring 31 (FIG. 2B) which is supported in the upper end of the hollow stem 21 by means of a retaining pin 32 or any other suitable retaining means. It should also be noted that one or more fluid passages 21d are provided near the upper end of the hollow stem 21, and preferably below the location of the spring 31, for permitting fluid or drilling mud to flow from the interior of the housing 15 to the interior of the hollow stem 21 for ultimately flowing to the drill bit B. The upper end of the shaft 20 engages a ball 33 (FIGS. 2A and 3) which also engages the lower end of an adjusting screw 34. The ball 33 is retained in position between the shaft 20 and the adjusting screw 34 by retaining collars 20b and 34a which are threaded or otherwise connected to the shaft 20 and the screw 34, respectively. The screw 34 is threaded through a seal plate 35 which is disposed within the tubular housing 15, and the axial position of the shaft 20 may be adjusted within limits by the adjustment of the screw 34. A locking nut 36 is threaded on the screw 34 for engagement with the seal plate 35 to lock the screw 34 in the desired position. With such construction, the shaft 20 may rotate relative to the adjusting screw 34 since the ball 33 is the only contact therebetween.

The seal plate 35 is not secured to the housing 15, but it is held against movement relative thereto during the use of the motor or engine of this invention. Thus, the seal plate 35 rests upon the bearing sleeve 37 which in turn rests upon upper port heads 38 (FIG. 3) and 39 which function together as the upper port head assembly, as will be explained. The upper port heads 38 and 39 rest upon an annular stator 40 which may be considered part of the upper rotor assembly R. The stator 40 rests upon an intermediate port head 41, and it in turn rests upon a stator 42 of the lower rotor means R. The stator 42 is supported on lower port head members 43 and 44, and they rest upon lower bearing sleeve 45 which is supported on the internal lateral annular shoulder 17a (FIG. 2B). Since the shoulder 17a is formed on the sleeve 17 which is in effect a part of the housing 15, it can readily be appreciated that the part supported thereon, including the seal plate 35, cannot move downwardly with respect to the housing 15 when they are in position as shown in FIGS. 2A and 2B. The seal plate 35 and all of the parts therebelow which rest upon the shoulder 17a are locked in position during use against movement relative to the housing 15 by an annular spider nut 47 (FIG. 2A) which has external threads 47a formed thereon and which are in threaded engagement with internal threads 15a on the housing 15. The nut 47 is threaded downwardly into firm contact with the seal plate 35 to securely hold the plate 35 and the parts therebelow which rest upon the shoulder 17a against movement relative to the housing 15. Fluid openings 47b are provided through the spider nut 47 to permit fluid to flow from the area interiorly of the nut 47 to the annular area externally thereof, for a purpose to be hereinafter explained, but it should be noted that an annular seal ring 35a which is preferably an O-ring formed of rubber or the like is positioned on the seal plate 35 to prevent any fluid flow past the seal plate 35.

For directing the fluid flow of the drilling mud or other similar well fluid from the upper end of the tubular housing 15 through the motor or engine M and then to the drill bit B therebelow, a plurality of fluid flow tubes or channels 50, 51 and 52 are provided. Such tubes or channels 50, 51 and 52 are preferably in the form of caps or substantially semi-cylindrical pipes which are welded or otherwise affixed to the external surface of the housing 15. The interior of the channel 50 is in fluid communication with the upper end of the tubular housing 15 and the upper port head 38 (FIG. 3) through port or opening 15b which is at the upper end of the channel 50 opposite the retaining or lock nut 47, and through the opening or port 15c in the housing 15 adjacent to the upper port head member 38. Thus, fluid such as drilling mud flows from the interior of the annular spider nut 47 in the upper end of the tubular housing 15 through the openings 47b, then through the port or opening 15b, then downwardly through the tube or channel 50, and finally through the lower port or opening 15c into the upper port head member 38.

The upper port head member 38 has an annular external flow channel 38a (FIGS. 2B, 3 and 7) which communicates with a downwardly extending axial opening 38b (FIGS. 3 and 7) which may be described as being quarter-moon shaped. The opening 38b fits over a correspondingly shaped axial opening 39a in the upper port head 39. The axial opening 39a communicates with another axial opening 39b which is slightly smaller than the opening 39a, but which is preferably of the same shape as such opening 39a and the opening 38b, whereby fluid flowing into the annular channel 38a flows through the openings 38b, 39a and 39b into the rotor assembly R for imparting rotation to the shaft 20, as will be explained more in detail hereinafter. After the fluid such as the drilling mud has been utilized for turning the upper rotor assembly R within the stator 40, the fluid is discharged or exhausted therefrom through openings 39c and 39d into opening 38c (FIGS. 2B and 7). The openings 38c, 39c and 39d are all of substantially the same shape, except that the opening 39c is preferably of a slightly smaller size and is displaced outwardly from the slot 39d. The opening or slot 38c which is substantially quarter-moon shaped, as best seen in FIGS. 6 and 7, is connected with a plurality of cylindrical openings 38d (FIG. 6) so that the fluid which is used to operate or drive the upper rotor assembly R is discharged or exhausted into the tubular housing 15 above the upper port head member 38.

The bearing support sleeve 37 is mounted in the housing 15 in the area above the upper port head member 38 and it is provided with a plurality of circumferentially spaced ribs having an internal diameter 37a which is less than the diameter of the major portion of such sleeve 37 (FIG. 2A). A plurality of longitudinal or axial channels or passages 37b are thereby provided between such spaced ribs. The fluid flowing upwardly as it exhausts from the upper rotor assembly R is directed through the channels or passages 37b to the area thereabove. One or more openings 37c are provided in the bearing support sleeve 37 for establishing communication with an annular recess 37d which is also formed therein. The annular recess 37d establishes fluid communication with discharge opening 15d (FIG. 2A) which is positioned opposite the tube or channel 52 on the exterior of the housing 15. Since the tube or channel 52 is in the form of a cap welded on the exterior of the housing 15, it is closed except for the passage provided from the opening 15d to a lower opening 15e (FIG. 2B) which is formed below the lower port head members 43 and 44. The opening 15e connects with an annular flow passage 45a and an opening or openings 45b so that the fluid is discharged into the interior of the bearing support sleeve 45 within the housing 15.

The bearing support sleeve 45 is formed in a manner identical with the bearing support sleeve 37 and thus it has a reduced internal bore or diameter 45c which corresponds with the reduced diameter 37a of the sleeve 37. Such reduced diameter 45c thus provides internal ribs which are separated by longitudinal or axial channels 45d through which the exhaust fluid passes to the area below the sleeve 45. Such fluid then passes on downwardly through the discharge openings 21d and into the bore of the hollow stem 21 for use with the drill bit B in its normal drilling operation.

The lower rotor assembly R is supplied with fluid under pressure such as the drilling mud from the tubing string T by directing such fluid through an opening 15f in the tubular housing 15 to the interior of the tube or channel 51 (FIGS. 2A and 4). The fluid then flows downwardly through the tube or channel 51 to the lower opening 15g (FIGS. 2B and 10) and then into an annular groove 44a which is in fluid communication with an axial slot 44b which preferably has the quarter-moon shape illustrated in FIG. 10. The lower port head member 43 has a slot or opening 43a which corresponds in shape and size to the opening 44b and establishes communication therebetween. A similar shaped opening 43b which is of a slightly smaller size and which is displaced outwardly therefrom is in fluid communication with the slot or opening 43a so that the fluid entering the opening 15g passes through the port head members 44 and 43 to the lower rotor assembly R for imparting rotation thereto and for imparting rotation to the shaft 20, as will be more evident hereinafter.

Summarizing the relationships of channels 50, 51 and 52 with openings 15b, c, d, e, f and g, the channel 50 connects with openings 15b and 15c for the direction of fluid under pressure to the upper rotor means R; channel 51 connects with openings 15f and 15g for the direction of fluid under pressure to the lower rotor means R; and channel 52 connects with openings 15d and 15e for the direction of spent fluids from upper rotor means R to a common exhaust fluid chamber below lower rotor means R and lower heads 43 and 44.

Also, it should be noted that since the tubes or caps forming the channels 50, 51 and 52 project radially outwardly from the external surface of the housing 15, longitudinal passages or areas are formed therebetween externally of the housing 15 which permit the return flow of fluid and cuttings from the drill bit back to the top of the well between the housing 15 and the well bore W.

The fluid is discharged from the lower rotor assembly R through slots 43c, 43d (FIG. 3) which are formed in the member 43 and then through slots 44c and openings 44d formed in the port head member 44 for exhausting or discharging the fluid from the lower rotor assembly R to the area interiorly of the lower bearing support sleeve 45. The slots 43d and 44c are of substantially the same shape and size, and the slot 43c is of substantially the same shape as the slots 43d and 44c, but is slightly smaller in size and is displaced outwardly therefrom. The relationship of the openings 44d to the slot 44c is best seen in FIG. 10. Thus, the fluid which is discharged from the lower rotor assembly R mixes with the fluid which is discharged or exhausted from the upper rotor assembly R in the interior of the lower bearing support sleeve 45, and thereafter such fluid flows together downwardly through the openings 21d, as previously explained in connection with the fluid flowing from the upper rotor assembly R.

The intermediate port head 41 (FIG. 3) is positioned between the two rotor assemblies R and is provided with upper recesses 41a (FIG. 3) and 41b (FIG. 2B). These recesses are positioned in axial alignment with openings 39b and 39c, respectively, and are of the same size and shape as said openings 39b and 39c, so that fluid under pressure has equal access to both the upper and the lower surfaces of the rotor in the upper rotor assembly R, thereby providing axial pressure balance relative to such rotor. Similarly, the intermediate port head 41 is provided with lower recesses 41c and 41d which are likewise in axial alignment with openings 43b and 43c, respectively, and are of the same size and shape as said openings 43b and 43c, respectively, thereby providing similar pressure balance relative to lower rotor R. Although such pressure balance of each rotor is desirable, it should be understood that such balance is not essential to the rotors.

The upper port head members 38 and 39 are preferably retained in position with the openings 38b and 39a oriented in axial alignment by a dowel pin or projection 38e which fits within a hole 39e. Similarly, the lower port head members 43 and 44 are held against movement circumferentially with respect to each other so as to orient the openings 43d and 44c in vertical or axial alignment by means of a dowel pin or projection 44e which is positioned in a hole 43e. The stator 40 is also preferably oriented relative to the member 39 by a dowel pin or projection 40a which extends into a hole 39f, and to the intermediate head member 41 by a dowel pin 40b which extends into a hole 41f. The stator 42 is also preferably oriented relative to the intermediate member 41 by the pin 42f which extends into an opening 41g, and to the member 43 by a pin 42g which extends into an opening 43f. With such dowel pins, the proper axial alignment and relative orientation of all parts is facilitated during assembly and is maintained in operation.

It should also be noted that fluid seals such as O-rings which are formed of rubber or other similar sealing material are provided throughout the apparatus for restricting the fluid flow to the proper openings and channels. Thus, the upper port head members 38 and 39 have seal rings 55 and 56, respectively, which provide a fluid seal on each side of the annular channel 38a. The intermediate port head 41 has a similar seal ring 57 which prevents fluid leakage between the two rotor assemblies R. The lower port head members 43 and 44 have seal rings 58 and 59, respectively, which provide a fluid seal on each side of the annular channel 44a. Such seals, together with the seal ring 35a serve to assure that the pressure fluid being supplied to the rotor assemblies R is not admixed with the exhaust fluid from the rotor assemblies R. It should also be noted that a fluid seal ring 63 is preferably provided between the spacer sleeve 17 and the housing 15 at the lower end of the assembly. Also at the lower end of the assembly, a seal ring 64 is preferably provided between the lower part of the spacer sleeve 17 and the bearing sleeve 18 (FIG. 2C). At the upper end of the assembly, a seal ring 68 (FIG. 2A) is provided between the housing 15 and the adapter section 16.

An important feature of this invention resides in the axial hydraulic balance of the shaft 20. The cross-sectional area of the shaft 20 exposed to fluid pressure is identical at its upper and lower ends. The fluid pressure to which the opposite ends of shaft 20 are exposed is equal and identical, this being exhaust pressure only, contained within the bores of sleeves 37, 45 and 17. The spring 31, the ball 33 and the screw 34 serve only to maintain axial location of the shaft 20 against gravitational or inertia forces.

Another important feature of this invention resides in the construction for distributing the torque or couple force applied to the shaft 20 by the fluid pressure acting on the two rotor means R. To minimize the fluid force acting laterally on the shaft 20 from the fluid pressure injected to the two rotor means R, such fluid under pressure is directed from diametrically opposite sides of the shaft 20. Thus, although the inlet channels or tubes 50 and 51 on the housing 15 are not diametrically opposite from each other, they communicate with fluid channels in the upper port head members 38 and 39 and the lower port head members 43 and 44 so that the fluid is directed in diametrically opposite directions toward the shaft 20 as it enters the two rotor means R. It can be seen in FIG. 7 that the arcuate or quarter-moon shaped opening 38b is positioned to the left of the shaft 20 and the upper right hand end of such opening 38b terminates near the upper point of the shaft 20 as viewed in FIG. 7. The other openings 39a and 39b are in substantially the same location with respect to the shaft 20, as previously explained, so that they too would assume substantially the same position as the opening 38b shown in FIG. 7. In FIG. 10, the opening 44b is illustrated with respect to the shaft 20 and it can be seen that such opening 44b is positioned to the right of the shaft 20 and that its lower left-hand end is approximately at the lower mid-point of the shaft 20 as viewed in FIG. 10. The openings 43a and 43b are circumferentially aligned with the opening 44b for establishing fluid communication therebetween and since they have substantially the same shape, they assume substantially the same position with respect to the shaft 20 as the opening 44b shown in FIG. 10. As will be explained more in detail, the rotor members of each of the rotor assemblies R have a plurality of vanes which are acted upon by the fluid pressure introduced from the channels 50 and 51, but the fluid force does not act upon such vanes until they reach a point just past the ends of the inlet openings. Therefore, with the upper rotor means, the vane must pass beyond the upper right-hand end of the opening 39b which is coextensive with the opening 38b (FIG. 7) before the fluid pressure acts thereon in a clockwise direction. In the case of the lower rotor means R, the vane must pass the left-hand lower end of the opening 44b before the fluid pressure acts thereon to turn the shaft in the clockwise direction. It is, therefore, believed evident that the fluid pressure takes effect when the vanes of the two rotor means are diametrically opposite from each other so that the radial force applied to the shaft 20 is in a diametrically opposite direction for the two rotor assemblies R. Since the rotor assemblies R are spaced longitudinally from each other, a couple or torque force results about the mid-point of the shaft 20. To reduce the extent of such couple force, the rotor assemblies R are positioned as close to each other as possible and, therefore, the intermediate port head 41 is made of minimum thickness. In other words, the couple movement developed is that force of the fluid acting radially on each rotor means multiplied by the distance from the rotor means to the mid-point of the shaft 20.

To counterbalance such couple force acting on the shaft 20, spaced bearings 60 and 61 are provided. Such bearings may be of any known construction, but preferably those bearings are of the type known as needle bearings which are simply relatively small roller bearings. The important feature is that such bearings 60 and 61 must be spaced longitudinally from the rotor assemblies R as great a distance as practicable so that the bearing load on the bearings 60 and 61 is reduced to a minimum. Each of the bearings 60 and 61 has a bearing load thereon which is equal to the fluid force applied laterally to the shaft 20 at each rotor assembly R multiplied by the distance of the rotor assembly R from the axial center of the shaft 20 and which product is divided by the axial distance of the bearing 60 or 61 from the axial center of the shaft 20. In other words, the torque force or bearing load applied to each of the bearings 60 and 61 multiplied by its lever arm which is the distance to the axial center of the shaft 20 from each bearing must be equal to the fluid force acting on each rotor assembly R multiplied by its lever arm or distance to the axial center of the shaft 20. Since the lever arms for each of the bearings 60 and 61 is extremely great compared to the lever arms for each of the rotor assemblies R, it will be evident that a very nominal force is applied to each of the bearings 60 and 61 and, therefore, very small bearings can be utilized as compared to the tremendous pressures developed in connection with the rotor assemblies R.

As previously stated, the bearings 60 and 61 preferably are roller bearings of the needle type, but ball bearings and other known types of bearings may be utilized. Such bearings must, of course, be capable of being lubricated by drilling mud and must be capable of functioning in such a fluid medium. As shown in the drawings, the bearing 60 includes a bearing housing 60a, and an alignment sleeve 60b, which has the needle or roller bearing 60c mounted internally thereof for engagement by the cylindrical portion 20e of the shaft 20. A retaining washer 60d holds the bearing parts in position during use. The bearing housing 60a may be press fitted or otherwise secured to the internal surfaces 37a of the ribs formed in the bearing support sleeve 37. The retaining ring 60d actually fits within a recess in the housing 60a and abuts against a retaining sleeve 60e which engages with the sleeve 60b.

The parts of the lower bearing 61 are identical with the parts of the bearing 60 and have like letter designations for corresponding parts. The bearing 61 is positioned on the lower cylindrical portion 20c of the shaft 20.

To prevent any lateral shifting or wobbling of the center of the shaft 20, but while still permitting axial movement thereof for the adjustment of the axial position of the shaft 20 in the housing 15, the shaft 20 is provided with an annular groove 20d (FIG. 3) in which a plurality of bearing balls 65 are positioned for contact with the internal cylindrical bore 41e of the intermediate head 41. Since the bore 41e is cylindrical and is not provided with a groove, the balls 65 simply contact such bore 41e and do not interfere with the axial movement of the shaft 20, but the balls 65 do prevent any lateral movement of the shaft 20, with respect to the intermediate port head 41, without appreciable lateral loading thereof.

On each side of the groove 20d, the shaft 20 is provided with octagonal portions 66 and 67. The octagonal portions 66 and 67 are each of a lesser axial length than the axial length of the rotor assembly R with which each is associated. Thus, the upper end of the octagonal portion 66 is normally spaced below the lower side of the upper port head member 39 and the lower end of the octagonal portion 67 is normally spaced above the upper surface of the lower port head member 43. The amount of such spacing determines the extent of axial movement of the shaft 20 which is possible with respect to the heads 39, 41 and 43 and permits the accurate positioning of the shaft 20 by the adjustment of the screw 34, as previously explained.

In FIG. 8 of the drawings, a cross-section of the lower rotor assembly R taken on line 8—8 of FIG. 3 is illustrated. The pressure port 43b and the exhaust port 43c are shown in dashed lines in FIG. 8 to illustrate the relative position thereof with respect to the lower rotor assembly R. The lower rotor assembly R includes a rotor body 70 which is formed with an octagonal bore 70a to conform with the octagonal surface 67 on the shaft 20, whereby the rotor body 70 is adapted to be axially slidable onto the octagonal surface 67 of the shaft 20. A plurality of swinging vanes 71 are pivotally mounted on the rotor body 70 for constant sealing engagement with the internal surface of the stator 42. Preferably, there are two pairs of the vanes 71 on the rotor body 70 and the vanes in each of the pairs are positioned diametrically opposite from each other. The vanes 71 on the lower left and the upper right as viewed in FIG. 8 are engaged at their inner surfaces by a push rod 72 (see also FIGS. 2B and 3) which is positioned in the central axial plane of the rotor body 70. The vanes 71 at the upper left and at the lower right as viewed in FIG. 8 are engaged by a pair of push rods 73 and 74 (FIG. 3) which are equally spaced from the central lateral plane passing through the rotor body 70 so that there is no tendency of any of the vanes 71 to tilt with respect to the body 70. All the push rods 72, 73 and 74 are preferably mounted in the manner illustrated for the push rod 73 in FIG. 8. As shown in FIG. 8, the push rod 73 extends through a bearing sleeve 73a and seal rings 73b and 73c so that the rod 73 may move relative to the shaft 20 and the rotor body 70, but fluid pressure cannot flow through the opening provided for push rod 73. On each side of the shaft 20, the rotor body 70 is provided with oval or elongate openings 70b (FIG. 8B) which are elongated in the longitudinal or axial direction so that the rotor 70 is free to move a relatively small amount relative to the push rods 72, 73 and 74 in an axial or longitudinal direction with respect to the shaft 20. Such axial movement enables the automatic centering of the rotor body on the shaft 20, whereby an equal clearance between the rotor body 70 with respect to the lower lateral surface of the intermediate port head 41 and the upper lateral surface of the lower port head member 43 is obtained. It is the equal fluid pressure on each side of the rotor body 70 and the vanes 71 which causes same to be automatically centered between the intermediate plate 41 and the lower port head member 43. Such automatic compensation or centering is normally sufficient to overcome any tendency of the vanes 71 or the rotor body 70 to drag or bind as they rotate relative to the intermediate port head 41 and the lower port head member 43.

Each vane 71 is provided with a longitudinally extending pivot head or enlargement 71a which is adapted to be positioned in a corresponding pivot slot or groove 70c. With such construction, the vanes 71 are mounted on the rotor body 70 for pivotal movement with respect thereto by axially or longitudinally sliding the vanes 71 with respect to the rotor body 70 with the enlarged pivot head 71a located in the slot 70c. The pivotal construction permits the pivotal movement of the vanes without radial or circumferential displacement of the vanes at the hinge points while at the same time eliminating any complicated hinge arrangement and it also facilitates the assembling and disassembling of the vanes in an axial direction.

The vanes 71 are not in direct contact with the rotor body 70, except at the hinge pivots 71a thereby to reduce friction therebetween. A seal element 76 is mounted on the rotor body 70 for engagement with the arcuate surface 71b of the vanes 71 so that as the vanes 71 swing relative to the rotor body 70, fluid under pressure is prevented from passing therebetween.

The vanes 71 are each provided with a resilient seal element 75 (FIG. 8A) for contacting the inner surface of the stator 42 during rotation of the rotor body 70 and the vanes 71 with respect to the stator 42 whereby the vanes 71 are restrained from direct contact with the stator 42 and whereby fluid under pressure is prevented from passing therebetween.

It should be noted that the pivot head 71a fits loosely within the slot 70c to permit a slight circumferential movement of each vane 71 relative to the rotor body 70 as it is acted upon by the fluid pressure to thereby permit the surface 71b to more firmly press against the seal 76 during the power stroke. During the power stroke, there is no radial movement of the vane 71 relative to the seal 76, so that no increased friction on the seal 76 results from such increased sealing action.

The preferred type of seal element 75 is illustrated in particular in FIGS. 8 and 8A. The seal element 75 is formed of rubber or other resilient material, and such element 75 fits within a recess 71c which extends longitudinally relative to the shaft 20 and is formed at the outer surface of the vanes 71. The seal element 75 is formed with spaced lips 75a and a longitudinal groove 75b therebetween so that a small cavity is provided for the containment of rubber displaced due to compression during assembly or during the operation of the engine. The base of the groove or recess 71c extends substantially vertically or axially, but its ends are closed or terminated by smoothly curved inclined inner surfaces 71d which terminate in a pointed edge 71e. The seal element 75 has curved ends 75c which correspond with the curvature of the closed ends on the inner surfaces 71d. Such inclined ends 75c are thus inclined outwardly so that they terminate in substantially the same plane as the upper and lower surfaces of the vanes 71. Thus, the ends of the seal element 75 are protected against any possible protrusion into the port openings of the intermediate port head 41 and the lower port head member 43 during the rotation of the rotor assembly R. However, the seal element 75 does extend outwardly sufficiently to completely seal off the space from the intermediate port head 41 to the lower port head member 43 and maintains a constant seal with the inner surface of the stator 42. The seal element 76 is constructed in an identical manner with the seal element 75, except that it is ordinarily slightly smaller in size.

The outer surface of the stator 42 is cylindrical, but the inner surface of the stator 42 has a modified ovoid eccentric shape. The center or axis of rotation of the shaft 20 and the rotor body 70 is indicated by the letter X. In order to explain the construction or shape of the inner surface of the stator 42, radius lines $a$—$a$ are shown in FIG. 8 to define an arcuate segment of the inner surface of the stator 42 of approximately 100°. Such arcuate segment of the inner surface of the stator 42 is designated by the numeral 42a. The segment 42a has an equal radius from one of the radius lines $a$ to the other radius line $a$ with the axis X as the radius point. Similarly, on the opposite side of the inner surface of the stator 42 an arcuate segment 42b is provided between radius lines $b$—$b$. The surface 42b extends for approximately 100° also and the radius of the surface 42b is the same for the distance from one of the radius lines $b$ to the other radius line $b$. It should be noted that the radius lines $a$ are directly opposite from the radius lines $b$ in FIG. 8 so that together they form diameter lines through the center X. The radius of the arcuate segment 42b also is from the axis or center X, but is of a lesser radius or amount than the radius of the arcuate segment 42a.

Between the radius lines $a$ and $b$ on each side of the stator 42, arcuate segments or cam surfaces 42c and 42d are formed. The surfaces 42c and 42d are not on a constant radius from the center point X, but instead are a gradual curve from the line $a$ to the line $b$, but the diameter which extends through the center point X from the arcuate surface 42c to the arcuate surface 42d is constant throughout the distances from the radius lines $a$ to the radius lines $b$. With such construction, all distances through the axis X are equal throughout the entire circumference of the inner surface of the stator 42. Thus, the vanes 71 are movable with respect to the rotor body 70 due to the eccentricity of the internal surface of the stator 42, but since the diameter of the inner surface of the stator 42 remains constant throughout its circumference and since the push rods 72, 73 and 74 maintain the vanes 71 in constant sealing contact with the inner surface of the stator 42, the diametrically opposed vanes 71 do not move radially with respect to each other as they rotate with the body 70, but they are permitted to move together radially with respect to the body 70 and the stator 42 in accordance with the changing curvature of the inner surface of the stator 42 with respect to the center point X.

It should also be pointed out that the segmental portion 42a of the stator 42 is in the area which may be termed the power stroke area of the stator 42 and the segmental portion 42b is in the area which may be termed the idle portion of the stator 42. Thus, as each vane 71 passes the lower left-hand end of the fluid pressure inlet opening 43b (dotted lines), the full amount of the fluid pressure acts against that vane 71 to urge same through the segmental area defined by the arcuate surface 42a. When that particular vane 71 which has been subjected to the pressure from the fluid inlet port or opening 43b reaches the exhaust opening or port 43c, the fluid pressure is then exhausted as previously described. Of course, while one of the vanes 71 is being supplied with the fluid pressure, one of the other vanes 71 is being exhausted or is being relieved of its pressure. For example, as shown in FIG. 8, the vane 71 at the lower left of that figure is being subjected to the fluid pressure from the inlet opening 43b, and the vane 71 on the lower right is approaching the point at which it will be subjected to the fluid pressure. The vane 71 at the upper left is passing over the exhaust opening 43c to permit the fluid in the chamber area of the rotor assembly R between the vane 71 at the upper left and the vane 71 at the lower left (FIG. 8) to exhaust from the rotor assembly R. The vane 71 at the upper right has just passed the exhaust opening 43c and is providing a seal with the stator surface 42b to prevent back leakage of pressure fluid from the opening 43b past that vane whereby the pressure differential across the vane which is at the lower left in FIG. 8 is maintained throughout its power stroke. Since the radius 42a is the same from one of the radius lines $a$ to the other one of the radius lines $a$, throughout substantially the 100°, there is no radial movement of the vane 71 which is passing through the power stroke area in contact with the internal surface 42a. The vane 71 which is diametrically opposite to the vane 71 in the power area is at the same time contacting the arcuate surface 42b which also has a uniform radius and therefore the vanes are not subject to binding, even though the rod 72, or the rods 73 and 74 are rigid as compared to the usual spring assemblies used to actuate vanes. Also, the fluid pressure acting on the opposite vanes and the push rods, such as the push rod 72, is balanced or substantially balanced so that there is no tendency for the push rod 72 or the vanes 71 in contact therewith to shift in either direction except in response to the eccentricity of the inner surface of the stator 42. If desired, by changing the circumferential position of the seal 75 relative to the seal 76, a slight imbalance may be provided to exert a slightly greater outward force on the vane 71 which is passing through the pressure area formed by the surface 42a of the stator 42. It should also be noted that the vane 71 passing through the power stroke area in contact with the inner stator surface 42a does not shift radially with respect to the rotor body 70 throughout its contact with the surface 42a, due to the fact that the surface 42a is formed entirely on the same radius from the center point X; therefore, the contact angle between the vane 71 and the surface 42a does not change during the power stroke which thereby prevents friction losses which would result if the vanes 71 were in radial motion relative to the surface 42a during the time the vanes are subjected to fluid pressure.

In FIG. 8, it will be noted that each of the vanes 71 are provided with an opening or openings 71f through the shank 71g thereof whereby fluid may pass without restriction as the vanes move radially with respect to rotor body 70 to thereby prevent entrapment of fluid or cavitation in the area between the vane shank 71g and the body 70.

The upper rotor assembly R is formed identically with the lower rotor assembly R, except that the eccentricity of the stator 40 of the upper rotor assembly R is disposed 180° with respect to the stator 42 of the lower rotor assembly R and therefore, the pressure can be and is admitted on the diametrically opposite side of the shaft 20 from the point at which the pressure is admitted to the lower rotor assembly R. The details of the upper rotor assembly R are not illustrated since the detailed drawing of FIG. 8 and the explanation in connection therewith should suffice for an understanding of the structure of the upper rotor assembly R also. In FIG. 3, the parts of the upper rotor assembly R which are illustrated and which have not been previously numbered herein have the same numerals as used for the lower rotor assembly R except that they are followed by a prime mark to distinguish them.

In the use or operation of the apparatus of this invention, the fluid-driven motor or engine M is assembled as illustrated in FIG. 1 adjacent to the drill bit B, and the tubing support T extends upwardly therefrom to the ground surface at the top of the well. The fluid under pressure is supplied through the tubing string T for operating the fluid-driven motor and for supplying fluid to the drill bit B for removing the cuttings and for the normal drilling operation with the drill bit.

It should be pointed out that prior to the assembly of the motor M with the drill bit B, the axial position of the shaft 20 is adjusted by loosening the nut 36 and turning the screw 34 to move the shaft 20 downwardly in opposition to the force of the spring 31 until the lower octagonal head 67 on the shaft 20 engages with the upper lateral surface of the lower port head member 43. Thereafter, the screw 34 is reversed in its rotational direction so that the spring 31 acts to urge the shaft 20 upwardly. The bolt 34 is turned in such reverse direction until one-half of the total clearance provided between the ends of the octagonal heads 66 and 67 and the port head members 39 and 43, respectively, is obtained in an upwardly direction, at which time the shaft 20 is positioned with substantially equal clearance between the upper surface of the octagonal head 66 and the lower surface of the upper port head member 39 and between the lower part of the octagonal head 67 and the upper surface of the lower port head member 43. The nut 36 is then tightened to hold the shaft 20 in a fixed position relative to the heads 39, 41 and 43. Even after the shaft 20 is so fixed in its selected position, the rotor body 70 is still permitted to move slightly axially due to the oval or elongate openings 70b (FIGS. 8 and 8B). Such axial movement merely permits the longitudinal centering of the rotor body 70 to provide free running clearances between each rotor body 70 and the heads on either side thereof to prevent any binding between the parts which rotate and the stationary parts of the rotor assemblies R. The same condition exists for the upper rotor assembly R, as is believed evident from the previous description.

With the various parts of the motor M thus assembled, and with the motor M connected as shown in FIG. 1, fluid such as drilling mud under pressure is supplied from the surface of the well through the tubing string T and it flows downwardly through the channels or tubes 50 and 51 for applying fluid under pressure to the rotor assemblies R on diametrically opposite sides of the shaft 20. The couple force thus created is transmitted to the bearings 60 and 61 as previously explained, and due to the extremely large distance between the bearings 60 and 61 as compared to the distance between the rotor assemblies R, the bearing load on the bearings 60 and 61 is extremely small as compared to the forces developed by the fluid pressure on the rotor assemblies R.

The fluid under pressure is exhausted from the upper rotor assembly R into the area above the port head members 38 and 39 and such fluid exhaust passes through the channels 37b and the openings 37c and 37d to the elongate external channel 52. The fluid flows from the channel 52 into the area of the tubular housing 15 below the lower port head members 43 and 44. The exhaust fluid from the lower rotor assembly R also flows into the area of the tubular housing 15 below the port head members 43 and 44.

The fluid exhaust or discharge flows from the area below the port head member 44 through the grooves of channels 45d and then passes downwardly through the openings 21d to the interior of the support stem 21 for flow to the drill bit B. Some of the drilling mud or fluid after discharge from the rotor assemblies R also flows through the openings or grooves 27a (FIG. 2C) between the bearing rings 26 and 27 so as to lubricate and cool the bearing 24 and the roller bearing 22 therebelow. The openings 22a permit the exhausting drilling mud or well fluid to pass outwardly therefrom as it circulates from the interior of the tubular housing 15.

Since the rotor assemblies R are of the positive displacement type which includes vanes, the power thereof can be closely controlled by the control of the fluid pressure and the rotative speed thereof can be controlled by the control of the fluid volume supplied thereto with suitable remote controls at the top of the well or other location. Such feature is extremely important since it enables positive selective control of the power and speed in conformity with the requirements for the most efficient drilling of whatever subterranean formations may be encountered.

It will be evident to those skilled in the art that the structure of the engine or motor described and illustrated herein and without modification thereof will function as a pump if torsional power is applied to the shaft 20 to impart rotation from the shaft 20 to the rotor assemblies R. Such torsional power may be supplied to the shaft 20 by any conventional power source such as an electric motor, steam turbine, gasoline or diesel engines, or any similar power source. If the structure of this invention is used as a pump, it will be understood that fluid will be pumped or forced through the housing 15 for discharge therefrom by reason of the rotation of the rotor assemblies R. It will therefore be understood that wherever the term "engine" or "motor" is used in connection with the structure of this invention, either in the specification or the claims, such term is not intended to restrict the structure of this invention to use as an engine or a motor and specifically it is intended that wherever functions which are categorically engine functions are described or claimed the same shall be also construed to include the function of the structure as a pump.

It is believed evident from the foregoing description in connection with FIGS. 1–11 that the invention is not limited to the use of a pair of rotor assemblies R in the engine or pump, but actually two or more rotor assemblies R may be employed within the spirit of this invention. To further illustrate the use of additional rotor assemblies, the diagrammatic views of FIGS. 12, 13 and 14 are included herewith FIG. 12 illustrates diagrammatically the preferred embodiment of this invention shown in detail in FIGS. 1–11. The shaft 20, the rotor assemblies R with stators 40 and 42, the heads 38, 39, 41, 43 and 44, and the bearings 60 and 61 are all schematically shown in FIG. 12 and bear like numerals to the corresponding parts which are shown in detail in FIGS. 1–11. The fluid inlets to the rotor assemblies R are diagrammatically shown and are of course representative of the flow to the rotors through channels 50 and 51. The exhaust fluid flow from the rotor assemblies is also diagrammatically shown to illustrate the flow of the exhaust fluid through the channel 52 from the upper rotor assembly R for flow out of the engine with the exhaust fluid from the lower rotor assembly R. The lateral fluid forces acting on the shaft 20 are illustrated in FIG. 12 by the force or vector lines F–1 and F–2. The force F–1 is a product of the fluid pressure and the area of the rotor acted upon by such fluid pressure. The force F–2 is determined in the same manner as the force F–1, and is acting in a diametrically opposite direction towards said shaft 20 as compared to the force F–1. Therefore, as previously explained, a couple force about the mid-point of the shaft results, but it is minimized by positioning the bearings 60 and 61 relatively large distances from such mid-point as compared to the distances of the rotor assemblies R therefrom.

FIG. 13 illustrates that the lateral fluid forces acting on the shaft and the shaft bearings can be completely balanced so that there is no lateral fluid force acting on the bearings. Fig. 13 also illustrates that the invention is not limited to the use of the rotor assemblies in pairs since, as shown in FIG. 13, three rotor assemblies R are used. The rotor assemblies R, shaft 20, and bearings 60 and 61 are identified in FIG. 13 with the same numerals as in FIGS. 1–12, because they could be identical with such parts which are shown in detail in FIGS. 1–11 and schematically in FIG. 12. The heads 100, 101, 102 and 103, the inlet fluid channels 104, 105 and 106, and the exhaust fluid channels 107 and 108 may be identical structurally with the heads and channels of FIGS. 1–11, but they must be re-arranged as indicated in FIG. 13 to direct the fluid to and from the three rotor assemblies R instead of just the two rotor assemblies R of FIGS. 1–12. The lateral fluid forces F–1 and F–3 acting in the same lateral direction on the upper and lower rotor assemblies R are balanced by an opposite lateral fluid force F–2 acting on the intermediate rotor assembly R. The force F–2 must equal the sum of the forces F–1 and F–3 if it is desired to completely balance the lateral fluid forces acting on the shaft 20 and the bearings 60 and 61. If the pressure of the fluid admitted to the three rotors is the same, the areas of the upper and lower rotors having forces F–1 and F–2 obviously must be reduced.

It should also be noted that the intermediate rotor assembly R may be the only power rotor assembly; in such case, the upper and lower rotor assemblies R would still have the fluid transmitted thereto through the channels 104 and 106 so as to balance the lateral fluid forces acting on the shaft 20, but they would be inactive rotors instead of power rotors. For example, as illustrated in FIG. 13A, each of the upper and lower rotor asemblies R could be constructed with a cylindrical rotor body 170 mounted on the shaft 20 for rotation therewith. Oppositely disposed seals 175 could be mounted on the stator 142 for constant sealing contact with the rotor body 170 to separate the fluid under pressure which is admitted through the channel 104 and the inlet 104a communicating therewith from the exhaust fluid in channel 107 and opening 107a communicating therewith (FIGS. 13 and 13A). Other possible constructions for such inactive rotor assemblies will occur to those skilled in the art.

FIG. 14 illustrates that the lateral fluid forces acting on the shaft and the shaft bearings can be completely balanced using two pairs of rotor assemblies so that there is no lateral fluid force acting on the bearings. The rotor assemblies R, shaft 20 and bearings 60 and 61 are identified in FIG. 14 with the same numerals as in FIGS. 1–13, because they could be identical with such parts which are shown in detail in FIGS. 1–11 and schematically in FIGS. 12 and 13. The heads 109, 110, 111, 112 and 113, the inlet fluid channels 114, 115, 116 and 117, and the exhaust fluid channels 118, 119 and 120, may be identical structurally with the heads and channels of FIGS. 1–11, but they must be rearranged as indicated in FIG. 14 to direct the fluid to and from the four rotor assemblies R instead of just the two rotor assemblies R of FIGS. 1–12. The couple or torque produced about the mid-point of the shaft 20 by lateral fluid forces F–1 and F–2 is balanced by an opposite couple or torque produced about the mid-point of the shaft 20 by lateral fluid forces F–3 and F–4, which forces F–3 and F–4 are of course less than the forces F–1 and F–2 in order to provide the balanced couples whereby no lateral fluid force is exerted on the bearings 60 and 61.

From the foregoing examples of the invention, it is believed obvious that the number and location of the rotor assemblies R may be varied within the scope of this invention so long as there are at least two of the assemblies R. With the modified forms of the invention shown in FIGS. 13 and 14, the lateral fluid forces acting on the shaft bearings 60 and 61 may be nullified as above explained, or if desired, a portion of the lateral fluid force acting may be transmitted to the shaft bearings 60 and 61. When the lateral fluid forces acting on the bearings 60 and 61 are balanced, such bearings could theoretically be eliminated, but from a practical standpoint, it is desirable to retain the bearings to act as stabilizers for preventing wobble of the shaft 20. If the bearings 60 and 61 are eliminated, the upper and lower rotor assemblies of FIG. 14 could be moved outwardly to the positions occupied by the bearings 60 and 61, or even if the bearings are retained, they may be positioned inwardly of the upper and lower rotor assemblies R.

In FIG. 15, a modified construction is illustrated which is substantially identical with the rotor assembly R shown particularly in FIG. 8, except that sliding vanes 271 are utilized in the FIG. 15 construction rather than the hinged vanes 71. The vanes 271 are engaged by the push rods 72, 73 and 74 in the same manner as previously described in connection with FIG. 8, so that the portion of each vane in contact with the inner surface of the stator remains the same distance from such portion of the oppositely disposed vane even though the vanes 271 move radially in accordance with the changing radius of the inner surface of the stator. The seals 275 are preferably substantially the same as the seals 75, but it will be appreciated that other seals may be utilized. Such seals 275 are therefore the portion of each vane 271 which is in contact with the inner surface of the stator 42. As can be seen in FIG. 15, the vanes 271 reciprocate or slide in contact with the walls or surfaces of longitudinally extending slots 270c as the vanes 271 move with the push rods relative to the rotor body 270. The operation of the construction of FIG. 15 with the sliding vanes 271 is therefore the same as the construction of FIG. 8, except that the vanes 271 slide or reciprocate relative to the rotor body rather than swinging relative thereto, as in the case of the swinging vanes 71.

In the form of the invention illustrated in FIG. 15, the push rods could be welded, soldered or otherwise connected with the sliding vanes 271, and there should be enough clearance around each push rod to permit fluid flow within the areas behind the vanes 271 to prevent locking thereof.

It should also be pointed out that this invention is not limited to the use of the specific type of seal element 75 which is illustrated and described because other seal elements may be utilized so long as they provide an adequate seal between each vane and the inner stator surface, but of course, the particular seal element 75 does have the advantages enumerated above.

If the form of the invention shown in FIG. 8 is utilized in the engine M, the seal elements 76 may be positioned on the opposite sides of the vanes 71 from that shown in FIG. 8, so that each seal element 76 would then seal with the external surface of one of the vanes 71, which surface would preferably be made arcuate to correspond with the arcuate movement of each vane 71 relative to the body 70 to provide a uniform sealing action at all times.

In FIGS. 16–21, a modified rotor and stator construction, including a modified vane construction, is illustrated in detail. FIG. 16 is enlarged as compared to FIG. 3 of the drawings, but it shows the modified rotor and stator construction which may be utilized in the form of the invention shown in FIG. 3 in place of the stator and rotor construction illustrated therein. The housing 15 which is illustrated in part in FIG. 16 is preferably substantially a duplicate of the housing 15 illustrated in FIG. 3 and the other views of the drawings. Within the housing 15, a shaft 320 is centrally positioned and it is substantially the same as the shaft 20 of FIG. 3 except for the central portion thereof which is illustrated in FIG. 16 which is formed in a cylindrical shape rather than in the flat-sided shape shown at 66 and 67 in FIG. 3. The rotor bodies 370 and 370' correspond with the rotor bodies 70 and 70' of FIG. 3 and they are similarly constructed except for the modifications indicated in the view shown in FIGS. 16 and 17 of the rotors 370 and 370'. One of the principal differences between the construction illustrated in FIGS. 16 and 17 as compared to that illustrated in FIG. 3 is that the rotors 370 and 370' are connected together by a connecting sleeve or spacer sleeve 341. Such sleeve 341 has external threads 341a and 341b which are connected with corresponding internal threads on the rotors 370 and 370', respectively, so that the rotors 370 and 370' are connected together for rotation and longitudinal movement. The connector or spacer sleeve 341 is connected to the shaft 320 with keys 345 (FIG. 18) which extend from keyways 341c into keyways 320a in the shaft 230. The keys 345 are of a reduced or shorter length than the keyways 320a in the shaft 320 to permit limited longitudinal movement of the spacer sleeve 341 relative to the shaft 320. However, it will be evident that rotation is transmitted from the shaft 320 to the spacer sleeve 341, or vice versa. The limited longitudinal movement of the spacer sleeve 341 is desirable because such movement is also permitted with respect to the rotors 370 and 370'. Since the rotors 370 and 370' are acted upon by fluid pressure below and above them, respectively, the limited longitudinal movement of such rotors 370 and 370' enables the fluid pressure to enter at each of the ends of the rotors exposed to such fluid pressure for balancing the fluid pressure acting thereon. Such construction eliminates or reduces the frictional drag which might otherwise occur between the ends of the rotors 370 and 370' and the plates or housing sections above and below the rotors. The lower plate or housing section 343 below the rotor 370 is illustrated in part in FIG. 16 and it would correspond with the plate or lower housing section 43 in FIG. 3. It will be also understood that a similar plate or housing section corresponding to the plate or housing section 39 of FIG. 3 would be present above the rotor 370'. The longitudinal movement of the spacer sleeve 341 and the rotors 370 and 370' referred to above would therefore permit the entry of fluid under pressure between the upper side or surface of the plate 343 and the lower end 370a of the rotor 370 and fluid pressure would likewise enter into the corresponding part at the upper end of the rotor 370' (not shown). Any tendency for the ends of the rotors 370 and 370' to bind or rub against the surfaces of the plate 343 and the plate (not shown) above the rotor 370' is therefore obviated or reduced.

In order to prevent the shaft 320 from wobbling during its rotational movement while at the same time permitting the longitudinal movement referred to in connection with the rotors 370 and 370', the external surface 341d of the spacer sleeve 341 is contacted by a plurality of ball bearings 365 (FIGS. 16 and 18) which are carried in an outer ring 346. The ring 346 carries a seal ring 347 which is in sealing contact with the internal surface of the housing 15 (FIGS. 16 and 18). Such ring 346 is also positioned between the stators 340 and 342 which correspond with the stators 40 and 42 of FIG. 3. Such stators 340 and 342 may be locked to the ring 346 in the same manner as described above in connection with a locking of the stators 40 and 42 to the ring 41 in FIG. 3.

Each of the rotors 370 and 370' has a plurality of sealing vanes 371 and 371', respectively. Since the vanes 371 and 371' are identical, a description of the vanes 371 as illustrated in FIGS. 17 and 20 and also in FIG. 16 will suffice for the vanes 371' also. In the preferred form of the invention, there would be four vanes 371 with the rotor 370 and there would also be four vanes 371' with the rotor 370'. Such vanes 371 and 371' would be located diametrically opposite from each other in the same manner as illustrated and described in connection with FIG. 8 of the drawings for the vanes 71. As shown in FIG. 17, the vanes 371 have the same seals 375 as the seals 75 in the vanes 71 in FIG. 8. Such seals 375 may be formed of rubber or any other suitable sealing material for contacting the internal surface of the stator 342. Each of the vanes 371 also has a pivot portion 371a which is positioned within a pivot groove or recess 370c in the same manner as described above in connection with the corresponding parts 71a and 70c shown in FIG. 8. Therefore, the vanes 371 are adapted to pivot as described above in connection with the vanes 71. Each of the vanes 371 also has the curved inner surface 371b which is adapted to move in constant sealing engagement with a seal 376 in the same manner as described previously in connection with the seal 76 for the surface 71b of each of the vanes 71. In place of the three openings 71f for the vanes 71 shown in FIG. 8, each of the vanes 371 has a single opening 371f which serves the same purpose (FIGS. 17 and 20).

The vanes 371 are also modified as compared with the vanes 71 in that the vanes 371 include two recesses 371h, one of which has a hard surfaced bearing ball 377 located therein for contact with the end of a push rod 373. Fluid openings 371m are provided through the vane 371 from the exterior thereof to the recesses 371h to permit fluid flow from the interior of the vane 371 to the exterior thereof to thereby prevent fluid lock as the vane 371 moves inwardly and outwardly with respect to the rotor body 370. As explained above in connection with FIG. 8, the push rod 73 extends from one of the vanes 71 to another of the vanes 71 on the diametrically opposite portion of the rotor 70. Similarly, in the form of the invention illustrated in FIGS. 16 and 17, the push rod 373 extends from one of the vanes 371 to another of the vanes 371 at a diametrically opposite position of the rotor body 370. The ends of each push rod 373 contact the hard surfaced bearing balls 377 (FIG. 16). The hard surfacing on the bearing balls 377 may be any of the usual hard surfacing materials such as carbide so as to provide a long wearing surface. The balls 377 are removable from the recesses 371h so as to permit the replacement of the balls 377 when wearing thereof occurs. The arrangement of the push rod 373 and the push rod 372 therewith (FIG. 16) differs to some extent from the arrangement of the push rods in connection with the form of the invention shown in FIGS. 1–8 in that only two push rods 370 and 372 are utilized in FIGS. 16 and 17. Furthermore, neither of such push rods 372 and 373 are centralized with respect to the vanes 371 with which it contacts. The diametrically opposite relationship of the push rods 372 and 373 is clearly illustrated in FIG. 16 and it will be evident that each of the rods 372 and 373 contact a pair of the vanes 371. It will also be evident that the recess 371h in each vane 371 which has one of the bearing balls 377 therein depends upon the position of the particular push rod which is to contact same. Thus, as shown in FIG. 16, the lower recesses 371h are utilized for the bearing balls 377 with the push rod 373, but the pair of vanes 371 which are aligned with the push rod 372 would each have a bearing ball 377 in its upper recess 371h. The corresponding push rod 372′ for the upper vanes 371′ is also illustrated in FIG. 16. It should be noted that the shaft 320 has openings 320b for the push rods 372, 373, 372′ and 373′ which are elongated longitudinally so that the push rods do not interfere with the limited longitudinal movement of the rotor bodies 370 and 370′ relative to the shaft 320.

The push rod 372 and 373 function in the same manner as described in connection with the push rods 72, 73 and 74 in the form of the invention illustrated in FIGS. 1–8 since each push rod serves to maintain the diametrically opposite pair of vanes 371 in constant sealing contact with the stator 342 even though the stator is formed in the eccentric manner described previously in connection with the stator 42. However, the vane and rotor body construction shown in FIG. 17 in particular is further modified as compared to the form of the invention shown in FIG. 8 to provide a limitation on the extent of outward movement of each of the vanes 371 so as to permit adequate sealing contact between the sealing member 375 and the inside of the stator 342 without adverse retarding of the movement of the vanes 371 rotationally relative to the stator 342. Such limitation on the outward movement of each of the vanes 371 is obtained with the use of an adjustable stop member 380 (FIGS. 17 and 21), each of which is fitted within a suitable notch or recess 370d in the rotor body 370. A plurality of longitudinally spaced openings 380a with enlarged bolt head receiving opening sections 380b are provided with each stop member 380 for receiving a corresponding number of bolts or screws 381 which are threaded or otherwise extended into the rotor body 370 (FIG. 17). Each of the bolt heads on the bolts 381 are ground or otherwise shaped to conform with the adjacent curvature of the external surface of the rotor body 370 as shown in FIG. 17 so that such bolt heads do not interfere with the movement of the rotor 370 past the reduced internal diameter portions of the eccentric internal surface of the stator 342.

Each stop member 380 has a stop shoulder 380c formed thereon or connected thereto for engagement by a co-acting shoulder 371p on the vane 371 adjacent thereto. The shoulders 371p and 380c contact each other when the vane 371 has moved to its fullest outward extent desired relative to the rotor 370. However, it will be evident that such construction does not interfere with the inward movement of the vane 371 with respect to the rotor 370 when such is permitted by the movement of the push rod 373. The position of the stop shoulder 380c can be varied by varying the thickness or number of spacer shims or washers 382 which are positioned between the stop member 380 and the bottom of the recess 370d. Therefore, a very accurate positioning of each of the vanes 371 can be obtained so that the maximum outward movement of each of the vanes 371 is limited for preventing a dragging contact between the seal 375 and the interior of the stator 342 while still obtaining the proper seal therebetween.

The operation and function of the form of the invention shown in FIGS. 16–21 is substantially the same as described above in connection with FIGS. 1–8 except that the outward movement of each of the vanes 371 is limited as described. Also, the rotors 370 and 370′ are adapted to move together because of their interconnection with the connector or spacer sleeve 341. The other differences in operation are believed evident from the foregoing description of the form of the invention shown in FIGS. 16–21.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. A fluid-driven motor adapted for use in rotating a drill bit in wells and the like, including a tubular housing, a shaft positioned in said housing for rotation relative thereto, rotor means slidably mounted on said shaft for limited relative longitudinal movement and for imparting rotational movement to said shaft, means for limiting the extent of the longitudinal sliding movement of said shaft relative to said rotor means, means for directing fluid under pressure to said rotor means from the upper end of the tubular housing to impart rotation to said rotor means, and means for engaging said shaft at each end thereof within said housing to obtain a limited axial adjustment of said shaft relative to said rotor means.

2. The structure set forth in claim 1, wherein the means for engaging said shaft at each end thereof includes a resilient means on which one end of said shaft rests, and a longitudinally movable retaining bearing in engagement with the other end of said shaft whereby longitudinal movement of said retaining bearing effects a longitudinal movement of said shaft while maintaining constant engagement of the ends of said shaft with said retaining bearing and with said resilient means.

3. A fluid-driven motor having a rotor assembly with a rotor and a stator, a vane with said rotor having a seal portion thereof in contact with the stator as said vane moves relative thereto, and interengaging means on said rotor and said vane to limit the movement of said seal portion towards said stator to prevent binding contact therebetween.

4. A fluid-driven motor having a rotor assembly with a rotor and a stator, a vane with said rotor having a seal portion thereof in contact with the stator as said vane moves relative thereto, and co-acting shoulders on said vane and said rotor for limiting the movement of said seal portion towards said stator to prevent binding contact therebetween.

5. The structure set forth in claim 4, including means for adjusting the position of one of said co-acting shoulders with respect to the other to vary the extent of the movement of the vane towards said stator.

6. A fluid-driven engine comprising, a tubular housing, a shaft positioned in said housing for rotation relative thereto, a pair of rotor assemblies mounted within said housing, a stator head at each end of each of said rotor assemblies, connection means connecting said assemblies for rotational and longitudinal movement together, and additional means connecting said assemblies to said shaft for the rotational movement of said shaft with said connection means and said rotor assemblies and for limited longitudinal movement of said rotor assemblies together relative to said shaft, whereby said assemblies are adapted to shift longitudinally together to prevent the ends thereof from becoming locked in contact with said stator heads.

7. A fluid-driven engine comprising, a tubular housing, a shaft prositioned in said housing for rotation relative thereto, a pair of rotor assemblies mounted within said housing, connection means connecting said assemblies for rotational and longitudinal movement together, and means for imparting rotational movement of said rotor assemblies to said shaft for rotational movement together while permitting limited longitudinal movement of said rotor assemblies together relative to the shaft, whereby said assemblies are adapted to shift longitudinally to maintain the ends thereof exposed to equal fluid pressure during rotation.

8. A fluid-driven engine for use in wells and the like, comprising a tubular housing having a stator and adapted to be suspended in a well bore, a shaft positioned in said housing for rotation relative thereto, a drill bit support means connected to said shaft and extending from said housing, a plurality of rotors mounted on said shaft and longitudinally spaced with respect to each other, bearing means for supporting said shaft in said housing and for resisting fluid forces acting on said shaft, means for introducing fluid under pressure to one of said rotors and towards a plane passing through the longitudinal axis of said shaft and only on one side of said plane for imparting rotation to said one of said rotors, and means for introducing fluid under pressure to another of said rotors from the opposite side of said plane towards said plane and only from said opposite side of said plane.

9. The structure set forth in claim 8, wherein said bearing means includes a bearing above and a bearing below said plurality of rotors, and wherein the bearings are longitudinally remote from each other and are spaced from said plurality of rotors by a relatively large distance as compared to the longitudinal distance between said one of said rotors and said another of said rotors, whereby the transverse force transmitted to said bearings is less than the transverse fluid force acting on the rotors.

10. The structure set forth in claim 8, wherein each of said rotors includes a rotor body, a pair of rotor vanes on said body which are substantially diametrically disposed with respect to each other, means mounting said rotor vanes on said body for pivotal movement relative thereto, and a rigid means interconnecting and spacing said pair of said rotor vanes for the movement of said vanes together relative to said rotor body and for maintaining said vanes in constant laterally spaced relationship with respect to each other.

11. The structure set forth in claim 8, wherein said stator has an internal surface which is eccentrically formed with respect to the axis of rotation of said rotor and which is engaged by said rotor during rotation thereof relative to the stator, said internal surface being shaped so that all distances through the axis of rotation of said rotor are equal throughout the entire circumference of said internal surface.

12. The structure set forth in claim 8, wherein said means for directing the fluid under pressure to said rotors includes circumferentially spaced elongate hollow tubes mounted on the external surface of said housing for directing the fluid flow in a direction lengthwise of said housing.

13. The structure set forth in claim 8, including means for affixing said rotors to said shaft for rotation therewith while permitting longitudinal movement of said shaft relative to said rotors, and means for mounting said shaft in said housing for longitudinal movement relative to said housing and said drill bit support means for reducing the transmission of thrust loads from said drill bit to said shaft.

14. The structure set forth in claim 8, wherein said plurality of rotors comprises at least one pair of rotors, and including means for hydraulically separating each of said rotors in said pair from each other, and means for coupling said rotors to said shaft for transmitting the rotation of said rotors to said shaft.

15. The structure set forth in claim 8, wherein said means for directing fluid under pressure to said rotors includes hollow tubes on said housing, ports in the wall of said housing for establishing communication between the interior of said housing and the interior of said hollow tubes.

16. The structure set forth in claim 8, including a drill bit having a flow passage therein, seal means for defining an exhaust chamber in said housing above and below said plurality of rotors, means for directing the exhaust fluid from said rotors to said exhaust chambers, and means for directing substantially all of said exhaust fluid from said exhaust chambers through said flow passage in said drill bit to wash away cuttings therefrom and otherwise facilitate the drilling of the well with the drill bit.

17. The structure set forth in claim 8, including a drill bit having a flow passage therein, seal means for defining an exhaust chamber in said housing above and below said plurality of rotors, means for directing the exhaust fluid from said rotors to said exhaust chambers, means for directing said exhaust fluid from said exhaust chambers through said flow passage in said drill bit to wash away cuttings therefrom and otherwise facilitate the drilling of the well with the drill bit, and said housing having hollow tubes on the exterior thereof and openings through the wall of the housing for establishing fluid communication from the area above the upper exhaust chamber through the interior of the hollow tubes to each of said rotors to thereby permit the fluid under pressure to by-pass the exhaust chamber above said rotors, and an additional hollow tube mounted on said housing with openings through the wall of said housing for establishing fluid communication from the upper exhaust chamber through said additional hollow tube to the area in the housing below said rotors to thereby by-pass the exhaust fluid in the upper exhaust chamber around said rotors.

18. A motor comprising, a shaft, a sequence of positive displacement rotary motor units mounted on said shaft, an upper radial bearing above and a lower radial bearing below said motor units said shaft for rotation, each of said motor units having a rotor and means for locking the rotor to the shaft for rotational movement therewith, a stator surrounding said rotor and having a tubular internal surface, said internal surface having one portion thereof with a greater radius from the axis of rotation of said rotor than the radius of another portion thereof from said axis, stator heads at the end of each rotor, movable vanes mounted on each said rotor within said stator and said stator heads, means on each of said vanes for sealing contact with said stator and said stator heads, inlet means for introducing pressure fluid into said stator, exhaust means for exhausting fluid from said stator, said rotor and at least one of said vanes of each motor unit serving as a barrier between the inlet means and the exhaust means at each point of rotation of each said rotors so as to create a pressure differential across such barrier as each rotor rotates with said shaft, and said inlet means and said exhaust means on said sequence of motor units being circumferentially positioned with respect to each other to reduce the radial forces acting on said radial bearings below the radial force which would act on said radial bearings if all of the radial force acting on said bearings through said shaft were from one radial direction.

19. As a sub-combination in a fluid-driven motor having a rotor assembly with a rotor and a stator, a vane with said rotor having an external recess therein, a resilient seal element in said recess and projecting outwardly therefrom to contact the stator as said vane moves relative to the stator, said ends of said recess being closed and the inner surfaces thereof being inclined upwardly and outwardly from the base thereof, and the ends of said seal element being also inclined upwardly and outwardly to correspond with the inclination of the inner surfaces of the ends of said recess.

20. A fluid-driven engine comprising, a shaft, an upper rotor assembly having an upper rotor body and vanes mounted thereon, a lower rotor assembly having a lower rotor body and vanes mounted thereon, each rotor body being connected to said shaft for rotational movement of each rotor body and the vanes therewith, each of said rotor assemblies also having a cylindrical stator within which its rotor body and vanes are confined, removable upper head means positioned above the upper end of the upper rotor body and removable lower head means positioned below the lower end of the lower rotor body, an intermediate head means between said upper rotor body and said lower rotor body, fluid passages provided through said upper and lower head means for directing operating pressure fluid to each rotor assembly and for discharging exhaust fluid from each rotor assembly, a housing for receiving said shaft and said rotor assemblies as a unit, means for directing the exhaust fluid from each rotor assembly into said housing, means in said housing for releasably retaining said stators and said head means in a fixed position relative to said housing, and other means in said housing for releasably retaining said shaft against lateral movement and in a selected axial position relative to said housing.

21. A fluid-driven motor adapted for use in rotating a drill bit in wells and the like, including a tubular housing, a shaft positioned in said housing for rotation relative thereto, an upper and a lower rotor means mounted on said shaft for imparting rotational movement to said shaft, means for directing fluid under pressure from the upper end of the tubular housing to the upper end of the upper rotor means and the lower end of the lower rotor means to impart rotation to said rotor means, and means for discharging the fluid from said upper rotor means to the area in the housing above said rotor means and for discharging the fluid from said lower rotor means to the area in the housing below said lower rotor means to create equal axial forces acting upwardly and downwardly on said upper and lower rotor means whereby no substantial axial thrust is exerted to the shaft by the fluid pressure forces acting on said rotor means.

22. The structure set forth in claim 21, including means for sealing off the areas above and below the rotor means in said housing from the fluid under pressure flowing to said rotor means.

23. The structure set forth in claim 21, including a drill bit having a flow passage therein, and means connecting said shaft to said drill bit including fluid flow means for directing fluid from said areas above and below said rotor means through said flow passage in said drill bit to facilitate the drilling operation with the drill bit.

24. A fluid-driven engine for use in wells and the like comprising, a shaft, bearing means for mounting said shaft for rotation, a plurality of rotor assemblies longitudinally mounted on said shaft with respect to each other, each of said rotor assemblies including a rotor body having vanes thereon, tubular stator means engageable by said vanes, end closures above and below each of said rotor assemblies, means for introducing fluid under pressure to each of said rotor assemblies for acting on at least one vane of each rotor assembly at a time and creating a pressure differential across a plane of said rotor body extending through the longitudinal axis of each rotor body for imparting rotation to said shaft, the pressure differential acting on each different rotor body creating a lateral fluid force on said shaft in a lateral direction, and the means for introducing the fluid pressure being positioned for directing such lateral fluid force on at least two of said rotor bodies in different lateral directions towards said shaft for obtaining at least a partial balancing of the lateral fluid forces transmitted to said bearing means.

25. The structure set forth in claim 24, wherein the means for introducing the fluid pressure is so positioned with respect to a pair of said rotor assemblies that a couple is created which acts on said shaft, and wherein such couple is transmitted through said shaft to said bearing means.

26. The structure set forth in claim 24, wherein said plurality of rotor assemblies includes three rotor assemblies, and wherein said means for introducing fluid pressure includes means for introducing fluid pressure to two of said assemblies on the same side of the shaft and means for introducing fluid pressure to the third of said assemblies on the diametrically opposite side of said shaft, said fluid pressure introduced to said third of said assemblies being equal to the sum of the fluid pressure introduced to said two of said assemblies so that the lateral fluid force created by the fluid pressure acting on said two of the rotor assemblies balances or substantially balances the lateral fluid force created by the fluid pressure acting on said third one of the rotor assemblies.

27. The structure set forth in claim 24, wherein said plurality of rotors includes at least two pairs of rotor assemblies, and wherein said means for introducing the fluid pressure is so positioned with respect to said two pairs of rotor assemblies that a couple force created by the fluid pressure acting on one pair of the rotor assemblies is balanced or substantially balanced by a couple force created by the fluid pressure acting on the other pair of the rotor assemblies.

(References on following page)

References Cited in the file of this patent

UNITED STATES PATENTS

| | | |
|---|---|---|
| 120,411 | Atwood | Oct. 3, 1871 |
| 612,191 | Case | Oct. 11, 1898 |
| 801,849 | Carpenter | Oct. 17, 1905 |
| 1,389,466 | White | Aug. 30, 1921 |
| 1,453,683 | Kochendarfer | May 1, 1923 |
| 1,770,488 | La Champ et al. | July 15, 1930 |
| 1,790,460 | Capeliuschnicoff | Jan. 27, 1931 |
| 2,002,387 | Bannister | May 21, 1935 |
| 2,113,651 | Heaston | Apr. 12, 1938 |
| 2,247,474 | Bowers et al. | July 1, 1941 |
| 2,353,534 | Yost | July 11, 1944 |
| 2,473,537 | McDonald | June 21, 1949 |
| 2,503,047 | Holcomb | Apr. 4, 1950 |
| 2,591,488 | Yost | Apr. 1, 1952 |
| 2,604,077 | Nast | July 22, 1952 |
| 2,660,402 | Devine et al. | Nov. 24, 1953 |
| 2,756,022 | Sturgeon | July 24, 1956 |
| 2,783,971 | Carle et al. | Mar. 5, 1957 |